(12) United States Patent
Cai et al.

(10) Patent No.: US 12,488,877 B2
(45) Date of Patent: Dec. 2, 2025

(54) SYSTEM AND METHODS FOR PRECISION TUMOR DELINEATION IN CANCER TREATMENT OR DIAGNOSIS FOR SUBJECTS WITH CARCINOMA BASED ON CONTRAST AGENT-FREE, VIRTUAL CONTRAST-ENHANCED MRI DATA

(71) Applicant: THE HONG KONG POLYTECHNIC UNIVERSITY, Hong Kong (CN)

(72) Inventors: Jing Cai, Hong Kong (CN); Wen Li, Hong Kong (CN); Tian Li, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 413 days.

(21) Appl. No.: 18/173,906

(22) Filed: Feb. 24, 2023

(65) Prior Publication Data
US 2024/0177832 A1    May 30, 2024

(30) Foreign Application Priority Data

Nov. 28, 2022   (CN) .......................... 202211502755.2

(51) Int. Cl.
G06K 9/00      (2022.01)
G06T 7/00      (2017.01)
G16H 30/40     (2018.01)

(52) U.S. Cl.
CPC ........... *G16H 30/40* (2018.01); *G06T 7/0014* (2013.01); *G06T 2207/10088* (2013.01); *G06T 2207/20081* (2013.01); *G06T 2207/30096* (2013.01)

(58) Field of Classification Search
CPC ........ G16H 30/40; G16H 50/20; G16H 50/70; G06T 7/0014; G06T 2207/20081; G06T 2207/30096; G06T 2207/20084; G06T 2207/30016; G06T 2207/10088–10096; G06T 2211/441; G06T 5/60; G06T 9/002; A61B 5/055; A61B 5/7264; A61B 5/7267;
(Continued)

(56) References Cited

U.S. PATENT DOCUMENTS

2019/0108634 A1*  4/2019  Zaharchuk ............... G06N 3/08
2021/0241458 A1*  8/2021  Zaharchuk ............. G06N 3/084
(Continued)

OTHER PUBLICATIONS

Kleesiek J, Morshuis JN, Isensee F, et al. Can virtual contrast enhancement in brain MRI replace gadolinium?: a feasibility study. Invest Radiol 2019; 54(10): 653-660.
(Continued)

*Primary Examiner* — Atiba O Fitzpatrick
(74) *Attorney, Agent, or Firm* — S&F/WEHRW

(57) ABSTRACT

The present disclosure provides a system and method for precision tumor delineation in cancer treatment or diagnosis for subjects with carcinoma, in particular, nasopharyngeal carcinoma, based on contrast agent-free, virtual contrast-enhanced MRI data (VCE-MRI) synthesized by a modified multimodality-guided synergistic neural network trained with a more diversified training dataset and having a higher generalizability by minimizing data distribution variation between an external dataset and the training dataset through a data distribution matching mechanism before VCE-MRI synthesis.

25 Claims, 11 Drawing Sheets

(58) Field of Classification Search
CPC ............ A61B 5/0042; A61B 2090/374; G06V 10/764; G06V 10/82; G06V 10/70; G06V 10/774–7796; G06V 10/454; A61N 2005/1055; G06N 3/0475; G06N 3/08–0985; G06N 3/02–126; G06N 20/00–20; G06F 18/214–2155; G06F 7/023; G06F 40/16; G06K 9/6256; G06K 9/6257; G06K 9/6259; G01N 29/4481
See application file for complete search history.

(56) References Cited

U.S. PATENT DOCUMENTS

| | | | |
|---|---|---|---|
| 2021/0383537 A1* | 12/2021 | Chitiboi | G06T 7/11 |
| 2022/0334208 A1* | 10/2022 | Tamir | G06T 5/50 |
| 2022/0343475 A1* | 10/2022 | Zhang | G06T 5/60 |
| 2023/0083261 A1* | 3/2023 | Reyes | A61B 5/0042 382/131 |
| 2024/0161256 A1* | 5/2024 | Wang | G06N 3/08 |
| 2024/0249395 A1* | 7/2024 | Datta | G06T 5/60 |
| 2024/0407663 A1* | 12/2024 | Pietsch | G06T 5/90 |

OTHER PUBLICATIONS

Bône A, Ammari S, Lamarque JP, et al. Contrast-enhanced brain MRI synthesis with deep learning: key input modalities and asymptotic performance. In 2021 IEEE 18th International Symposium on Biomedical Imaging (ISBI) 2021: 1159-1163.

Gong E, Pauly JM, Wintermark M, et al. Deep learning enables reduced gadolinium dose for contrast-enhanced brain MRI. J Magn Reson Imaging 2018. 48(2): 330-340.

Lange S, Mędrzycka-Dbrowska W, Zorena K, et al. Nephrogenic systemic fibrosis as a complication after gadolinium- containing contrast agents: a rapid review. International Journal of Environmental Research and Public Health 2021; 18(6): 3000.

Luo H, Zhang T, Gong NJ et al. Deep learning-based methods may minimize GBCA dosage in brain MRI. Eur Radiol 2021; 31(9): 6419-6428.

Pasumarthi S, Tamir JI, Christensen S, et al. A generic deep learning model for reduced gadolinium dose in contrast-enhanced brain MRI. Magn Reson Med 2021; 86(3): 1687-1700.

Chen C, Raymond C, Speier B, et al. Synthesizing MR Image Contrast Enhancement Using 3D High-resolution ConvNets. ArXiv preprint arXiv: 2104.01592. 2021.

Zhao J, Li D, Kassam Z, et al. Tripartite-GAN: synthesizing liver contrast-enhanced MRI to improve tumor detection. Med Image Anal 2020; 63: 101667.

Xu C, Zhang D, Chong J, et al. Synthesis of gadolinium-enhanced liver tumors on nonenhanced liver MR images using pixel-level graph reinforcement learning. Med Image Anal 2021; 69: 101976.

Li W, Xiao H, Li T, et al. Virtual Contrast-enhanced Magnetic Resonance Images Synthesis for Patients with Nasopharyngeal Carcinoma using Multimodality-guided Synergistic Neural Network. Int J Radiat Oncol 2021; 112(4): 1033-1044.

* cited by examiner

SYSTEM AND METHODS FOR PRECISION TUMOR DELINEATION IN CANCER TREATMENT OR DIAGNOSIS FOR SUBJECTS WITH CARCINOMA BASED ON CONTRAST AGENT-FREE, VIRTUAL CONTRAST-ENHANCED MRI DATA

CROSS-REFERENCE TO RELATED APPLICATION

This application claims priority from a Chinese patent application number 202211502755.2 filed Nov. 28, 2022, which disclosure is incorporated herein by reference in its entirety.

PRIOR DISCLOSURES BY THE INVENTOR OR A JOINT INVENTOR

Part of the present invention was disclosed in (1) a paper entitled "Virtual Contrast-Enhanced Magnetic Resonance Images Synthesis for Patients With Nasopharyngeal Carcinoma Using Multimodality-Guided Synergistic Neural Network" published in the *International Journal of Radiation Oncology\*Biology\*Physics*, Volume 112, Issue 4, Pages 1033-1044 (DOI: 10.1016/j.ijrobp.2021.11.007) on Mar. 15, 2022; and (2) a conference abstract entitled "Gadolinium-free Contrast-enhanced MRI (GFCE-MRI) Synthesis via Generalizable MHDgN-Net for Patients with Nasopharyngeal Carcinoma" for Joint Annual Meeting ISMRM-ESMRMB ISMRT 31$^{st}$ Annual Meeting held on May 11, 2022, and the disclosures of which are incorporated herein by reference. The paper and conference abstract are grace period inventor-originated disclosures disclosed within one year before the effective filing date of this application.

TECHNICAL FIELD

The present invention relates to a system and methods for precision tumor delineation in cancer treatment and diagnosis based on contrast agent-free, virtual contrast-enhanced magnetic resonance images (VCE-MRI) generated by a multi-hospital data-guided neural network (MHDgN-Net), in particular, using the MHDgN-Net to improve diversity of training samples and model generalizability for generation of the VCE-MRI.

BACKGROUND

Nasopharyngeal carcinoma (NPC) is a highly aggressive malignancy that is particularly popular in the population of East and Southeast Asia. Currently, the mainstay treatment for NPC is radiotherapy. Precision tumor delineation is the most critical prerequisite of a successful radiotherapeutic treatment for NPC. Contract agents such as gadolinium-based contrast agents (GBCAs) have been widely used in the current precision tumor delineation to enhance the contrast of brain magnetic resonance images (MRI) due to their excellent tumor-to-normal tissue contrast. Nonetheless, gadolinium exposure has been reported to strongly associate with allergic reactions and fatal nephrogenic systemic fibrosis (Gong et al., "Deep learning enables reduced gadolinium dose for contrast-enhanced brain MRI". *Journal of magnetic resonance imaging*. 2018; 48(2):330-40).

Recently, a deep learning-assisted gadolinium-free contrast-enhanced MRI (GFCE-MRI) has been proposed as an alternative to reduce or eliminate the use of GBCAs (Kleesiek et al., "Can virtual contrast enhancement in brain MRI replace gadolinium? a feasibility study". *Investigative radiology*. 2019; 54(10): 653-60; Luo et al., "Deep learning-based methods may minimize GBCA dosage in brain MRI". *European Radiology*. 2021; 31: 6419-28; Chen et al., "Synthesizing MR Image Contrast Enhancement Using 3D High-resolution ConvNets". arXiv:2104.01592. 2021 Apr. 4). However, these existing GFCE-MRI models suffer from a bench-to-bedside deficiency in low or unknown model generalizability. The effect of failing to leverage complementary information between input imaging modalities can be more prominent in the case of deeply infiltrative NPC because of intricated relationship of pixel intensity among different imaging modalities.

A need therefore exists for an improved neural network and model that at least diminishes or eliminates the disadvantages and problems described above.

SUMMARY OF INVENTION

Accordingly, a first aspect of the present invention provides a system for precision tumor delineation in cancer treatment or diagnosis for subjects with carcinoma built on a multimodality-guided synergistic neural network (MMgSN-Net) provided in Li et al. (2022), and incorporates a mixture model of multiple hospital training data and an external data distribution matching method to increase diversity of training samples and minimize intensity variation of external data, respectively, in order to increase the model generalizability of a multi-hospital data-guided neural network.

In the first aspect, the present system includes:
- a data acquisition module acquiring MRI data from at least two medical institutions, the acquired MRI data including contrast agent-free T1-weighted (T1w), T2-weighted (T2w) MRI data, and contrast-enhanced MRI (CE-MRI) data;
- a data pre-processing module pre-processing the acquired MRI data comprising resampling thereof by standardizing image size of different MRI data acquired from different medical institutions and subjecting the resampled MRI data to normalization or standardization, said normalization or standardization including normalization or standardization based on a whole image dataset, a single image data, or image data obtained from a single subject;
- a model training module utilizing the T1w-MRI and T2w-MRI data from a training dataset containing some of the T1w-MRI, T2w-MRI and CE-MRI data after said pre-processing as an input of the neural network while utilizing the CE-MRI data from the training dataset as a learning target of the neural network only for model training and internal evaluation; and
- a virtual image generation module utilizing contrast agent-free MRI data from at least one external medical institution for external evaluation prior to generating a virtual contrast-enhanced MRI (VCE-MRI) data, said at least one external medical institution being different from the at least two medical institutions.

In certain embodiments, the acquired MRI data from the at least two medical institutions include MRI data acquired under different scanning conditions. Said scanning conditions may include one or more of the followings: magnetic field intensity, configuration of RF coil(s), spatial resolution of images, phase encoding levels, use of fast scanning sequence, scanning time, repetition time (TR), echo time (TE), and number of excitation (or NSA), etc.

In certain embodiments, the acquired MRI data from the at least two medical institutions include MRI data obtained from MRI scanners of different manufacturers.

In certain embodiments, the acquired MRI data include 1.5T MRI and 3T MRI data.

In certain embodiments, the T1w-MRI, T2w-MRI and CE-MRI data of different subjects are acquired on the same day in sequence.

In certain embodiments, the virtual contrast-enhanced MRI data is generated by using MRI imaging and scanning parameters of the external medical institutions to scan the subjects.

In certain embodiments, the MRI data from different subjects are randomly selected for modifying the MRI imaging and scanning parameters in order to enhance the diversity of the training dataset.

In certain embodiments, the normalization or standardization is performed by z-score normalization.

In certain embodiments, the z-score normalization is based on the image data obtained from a single subject.

In certain embodiments, the neural network is built based on an architecture of MMgSN-Net.

In certain embodiments, the MMgSN-Net is configured to become a two-input neural network including sub-components of multimodality learning modules, synthesis network, self-attention module, multi-level module and discriminator.

In certain embodiments, the T1w-MRI and T2w-MRI data are separately inputted into two different multimodality learning modules.

In certain embodiments, the two different multimodality learning modules extract features from the T1w-MRI and T2w-MRI data, respectively.

In certain embodiments, the extracted features from the T1w-MRI and T2w-MRI data by the respective multimodality learning modules are fed to the synthesis network for complementary feature selection and fusion.

In certain embodiments, the selected and fused features after the synthesis network are further subjected to self-attention module and multi-level module for focusing on an enhanced exploded structure and increasing the network insight, thereby emphasizing regions of relatively larger tumors and tissues adjacent thereto.

In certain embodiments, the features after being subjected to the self-attention module and multi-level module are used to generate virtual contrast-enhanced MRI (VCE-MRI) data.

In certain embodiments, the as-generated virtual contrast-enhanced MRI data and contrast-enhanced MRI (CE-MRI) data obtained from GCBAs-injected subjects are fed into the discriminator to train the discriminator how to differentiate images of VCE-MRI from CE-MRI, and feedback the training result to the synthesis network, thereby increasing synthesis accuracy of VCE-MRI and the decision making accuracy by the discriminator.

Detailed architecture and model development of MMgSN-Net can be referred to the Detailed Description of the Invention section hereinafter and the article entitled "Virtual Contrast-Enhanced Magnetic Resonance Images Synthesis for Patients With Nasopharyngeal Carcinoma Using Multimodality-Guided Synergistic Neural Network" by the present inventors, which disclosure is incorporated herein by reference.

By using MMgSN-Net as a basis, the generalizability of the model with respect to the MRI data from the external medical institution is increased through inputting the training dataset of MRI data obtained under different scanning conditions and after said pre-processing into the MMgSN-Net for model training and confinement, in order to establish a more generalizable model.

In certain embodiments, the present system further includes a data matching module for distribution matching of a mean value of an external dataset formed from image data of the at least one external medical institution with a mean value of the target training dataset formed from the closest training dataset to the external dataset in order to minimize intensity variation of the external dataset.

In certain embodiments, the distribution matching is performed according to the following equation:

$$y=(\mu1/\mu2)*x,$$

where x represents pixel value of MRI data of the external dataset; μ1 represents mean pixel value of the target training dataset; μ2 represents mean pixel value of the external dataset; y represents the matched pixel value.

In certain embodiments, the external dataset after the distribution matching has the same mean pixel value as that of the target training dataset which minimizes data distribution variation of the external dataset, thereby improving generalizability of the model after training and also reserving original scale of the image data.

In certain embodiments, the neural network can be adjusted by increasing the volume of the training dataset.

In certain embodiments, the present system further includes a classification network to screen out unfit data from the model in order to increase the model reliability.

A second aspect of the present invention provides a method for improving generalizability of a neural network for precision tumor delineation in cancer treatment or diagnosis for subjects with carcinoma based on contrast agent-free, virtual contrast-enhanced MRI data generated by the neural network, where the method includes forming a training dataset containing some of MRI data obtained from different subjects and/or acquired under different imaging and scanning conditions from multiple medical institutions to increase diversity of the training dataset followed by pre-processing to normalize or standardize image size of multiple MRI data prior to inputting the pre-processed MRI data into a multimodality-guided synergistic neural network (MMgSN-Net) for training to obtain a multi-hospital data-guided neural network (MHDgN-Net), matching an external dataset obtained from at least one external medical institution with the training dataset to obtain a matched pixel value such that both the external dataset and the training dataset have the same mean pixel value to minimize intensity variation of the external dataset, and inputting the external dataset after said matching into the MHDgN-Net for external evaluation, prior to generating virtual contrast-enhanced MRI (VCE-MRI).

In certain embodiments, only T1w-MRI and T2w-MRI data from the training dataset are matched with the corresponding T1w-MRI and T2w-MRI data from the external dataset in order to avoid using contrast-enhanced MRI (CE-MRI) data obtained from GBCAs.

In certain embodiments, the generalizability of the neural network can be validated by the external dataset after said matching.

In certain embodiments, the matching of the external dataset with the training dataset is performed by the following equation:

$$y=(\mu1/\mu2)*x,$$

where x represents pixel value of MRI data of the external dataset; μ1 represents mean value of the target training dataset; μ2 represents mean value of the external dataset; y represents the matched pixel value.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 6:
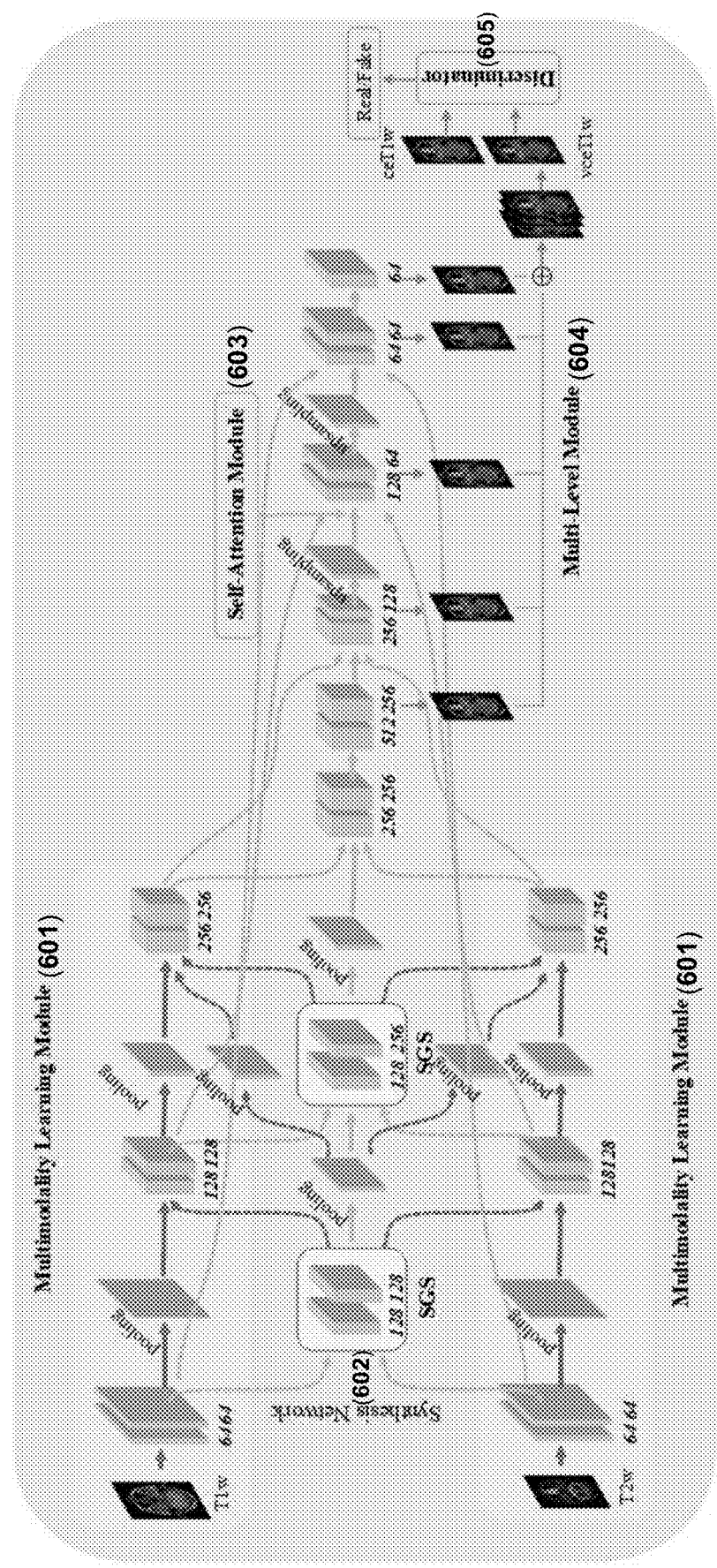
FIG. 6 schematically depicts an architecture of MMgSN-Net for model training module according to certain embodiments of the present invention.

The present invention provides a multi-hospital data-guided neural network (MHDgN-Net) including at least four modules: data acquisition module, data pre-processing module, model training module, and virtual image generation module. The model training module of the present invention is primarily constructed based on the MMgSN-Net disclosed in Li et al. (2022). A more detailed architecture of MMgSN-Net is illustrated in FIG. 6 and the corresponding descriptions provided hereinafter.

The proposed MHDgN-Net can be mainly divided into two stages: a mixture modeling (MM) and an external distribution matching (EDM). At the stage of MM, MRI data obtained from different medical institutions, e.g., different hospitals, are integrated to construct a mixture dataset. To keep the patient number of the mixture dataset consistent with that of each individual hospital dataset, a certain number of patients are randomly sampled from each hospital, e.g., 18 patients from each hospital. Following that, one patient is randomly excluded from the mixture dataset, i.e., only 53 patient samples remain in the mixture dataset from three different hospitals when each randomly sampled with 18 patients. A mixture model is thereby generated based on the mixture dataset.

Since different hospitals may use different imaging and scanning protocols/parameters, it will result in various intensity distribution in the mixture dataset, reducing generalizability of the mixture model. To improve the generalizability, EDM is performed which is an indirect approach by minimizing intensity variation of an external data obtained from one or more external medical institutions which is/are different from those at where the dataset for training the deep learning model (or mixture model) is generated. Such external dataset matches the mixture dataset according to the following equation:

$$y=(\mu1/\mu2)*x \quad (1),$$

where x represents pixel value of the external dataset; $\mu1$ represents slice-based overall mean pixel value of the mixture dataset; $\mu2$ represents mean pixel value of the external dataset; y represents the matched pixel value.

Figure 4:
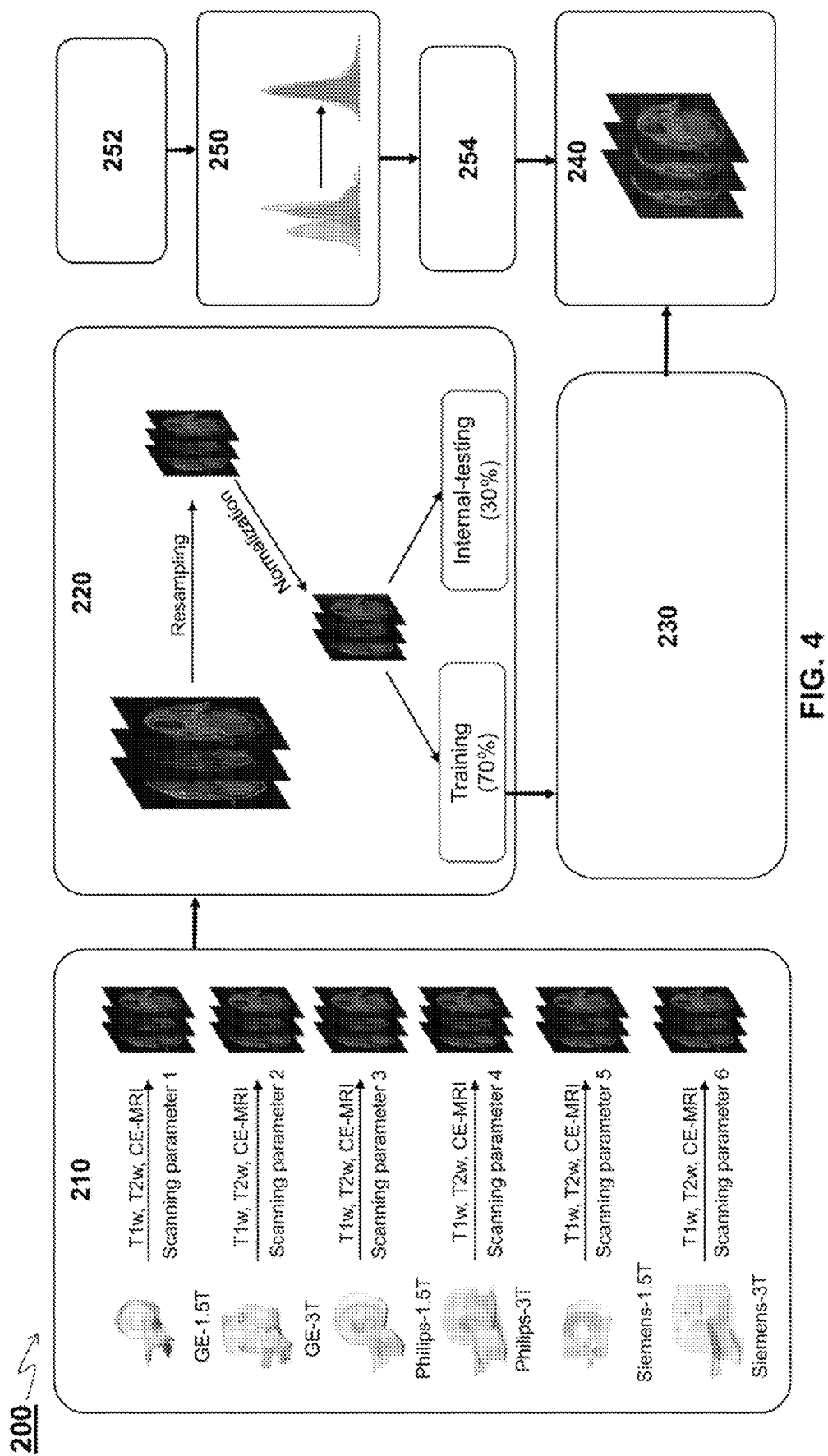
FIG. 4 schematically depicts an architecture of the present system for generating virtual contrast-enhanced MRI (VCE-MRI) according to other embodiments.
Figure 12:
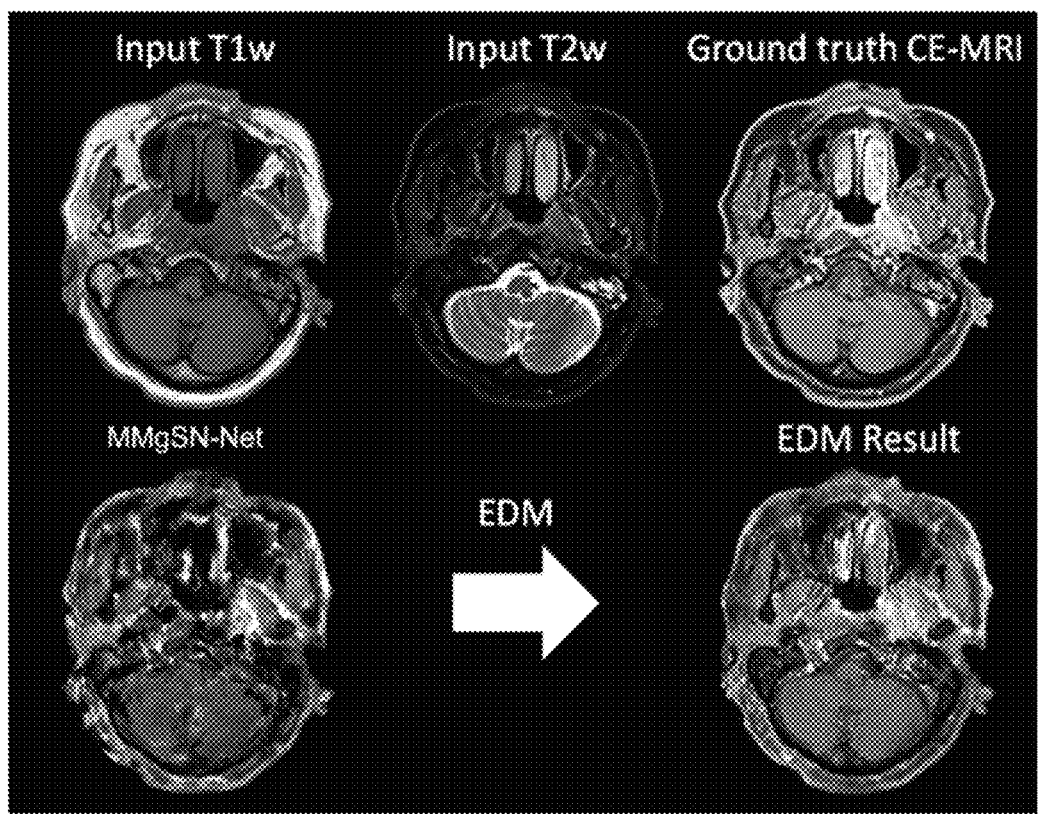
FIG. 12 shows a comparison in terms of image quality of the synthetic VCE-MRI generated by MMgSN-Net before and after applying the external distribution matching (EDM) to the training dataset. The top row from left to right: input T1w MRI, input T2w MRI, and the ground truth CE-MRI, respectively. The bottom row from left to right: synthetic VCE-MRI images from MMgSN-Net trained without and with the EDM, respectively.

After EDM, the mean pixel value of the external dataset matches the mean pixel value of the mixture dataset such that the data distribution variation is minimized, thereby indirectly reducing generalizability of the mixture model. A comparison of the synthetic VCE-MRI by MMgSN-Net with and without EDM is illustrated in FIG. 12, in which the image before EDM (bottom left figure) is more blurry and less distinctive at tumor lineages and edges adjacent to surrounding tissues, compared to that after EDM (bottom right figure) which is closer to ground truth CE-MRI (top right figure) in terms of the image quality and structural details of the axial slice. Different from z-score normalization, EDM can reserve the scale of the original data. The external data with the matched pixel value will be inputted to the mixture model for generating contrast-agent free, virtual contrast-enhanced MRI (VCE-MRI). More details on implementing EDM will be provided hereinafter and the schematics as shown in FIG. 4.

Figure 1:
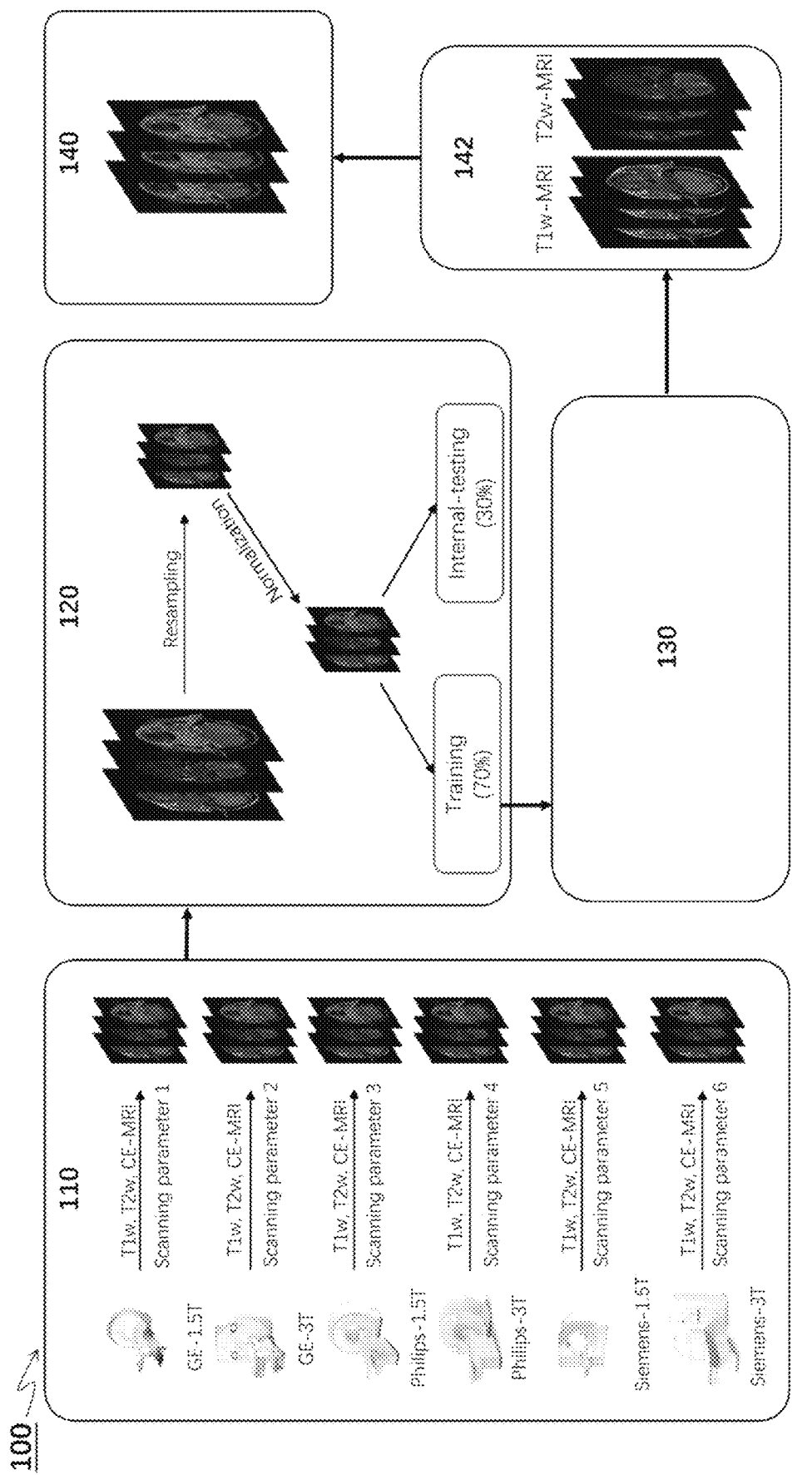
FIG. 1 schematically depicts an architecture of the present system for generating virtual contrast-enhanced MRI (VCE-MRI) according to certain embodiments.

Turning to FIG. 1 which illustrates a basic architecture of MHDgN-Net according to certain embodiments of the present invention, the data acquisition module 110 of the MHDgN-Net 100 is configured to acquire MRI data from multiple medical institutions including, but not limited to, hospitals. At least two medical institutions are selected to collect the corresponding MRI data. In this example, MRI data including T1-weighted (T1w), T2-weighted (T2w) and GBCA-based contrast-enhanced MRI (CE-MRI) data from four different hospitals were collected. Each hospital may use different MRI imaging devices from various manufacturers including, but not limited to, GE, Philips and Siemens. The corresponding MRI data were acquired by 1.5T and/or 3T MRI scanners from each of the manufacturers available at each of the medical institutions. Table 1 summarizes the number of enrolled patients from each hospital, their background, and parameters used in each modality in this example.

TABLE 1

| Hospital (vendor-FS) | No. of Enrolled Patient | Average Age | Sex | Modality | TR (ms) | TE (ms) | Contrast Density |
|---|---|---|---|---|---|---|---|
| Hospital 1 (Simens-1.5T) | 71 | 56 ± 11 | Male: 52 Female: 19 | T1w T2w CE-MRI | 562-739 7640 562-739 | 13-17 97 13-17 | / / 0.1 mmol/kg |
| Hospital 2 (Philips-3T) | 71 | 49 ± 15 | Male: 55 Female: 16 | T1w T2w CE-MRI | 4.8-9.4 3500-4900 4.8-9.4 | 2.4-8.0 50-80 2.4-8.0 | / / 0.1 mmol/kg |
| Hospital 3 (Simens-3T) | 71 | 57 ± 12 | Male: 56 Female: 15 | T1w T2w CE-MRI | 620 2500 3.42 | 9.8 74 1.11 | / / 0.1 mmol/kg |
| Hospital 4 (GE-3T) | 18 | 53 ± 14 | Male: 14 Female: 4 | T1w T2w CE-MRI | 4.3-8 4200-4899 4.3-8 | 3-7 60-80 3-7 | / / 0.1 mmol/kg |

Among 71 enrolled patients from each of Hospitals 1 to 3, each group was randomly split into 53 and 18 patients for model training; Hospital 4 was used for external evaluation. All enrolled patients were scanned with contrast agent-free T1w and T2w MRI, and GBCA-based CE-MRI. The collected T1w and T2w MRI data will be used as input for model learning; CE-MRI will be used as learning target of the model training.

To increase the diversity of the training dataset, it is possible to vary the MRI imaging/scanning parameters when acquiring some of the patients' samples, for instance, about 50% of the patients' samples are varied in terms of the imaging/scanning parameters: change T/R coil into body coil; reduce NSA; change into a faster imaging sequence; vary TR, TE value within 5-10%, etc.

After the acquisition of MRI data by the data acquisition module 110, the data will be fed to a data pre-processing module 120. In the context of deep learning model, there are usually two main methods for data normalization/standardization: 0-1 normalization and z-score normalization. Before normalization/standardization, the MRI data fed from the data acquisition module 110 are resampled. MRI data collected from different hospitals or acquired by different MRI scanners will vary in size/resolution. Bilinear interpolation can be adopted to resample the MR images with different sizes/pixels into a 256*224 configuration, for example, which can be enabled according to the following pseudo-code:

cv2.resize(input_image,(224,256),
interpolation=cv2.INTER_LINEAR)

After the resampling, the mean pixel value and standard deviation of the whole image volume of each patient are computed, followed by standardization of the MRI data of that patient using z-score normalization method.

Another method of normalizing the MRI data of a patient is 0-1 normalization, i.e., to map the data within the range of 0-1 for processing. The following equation is employed:

$$x^*=(x-\min)/(\max-\min) \quad (2),$$

where x denotes the sample value; min denotes the smallest value of sample range; max denotes the largest value of sample range; x* denotes the value after normalization.

As compared to 0-1 normalization method, z-score normalization method makes the data after pre-processing in compliance with standard normal distribution, i.e., the normal value ($\mu$) is 0; standard deviation ($\sigma$) is 1. In other words, the data is normalized as: data distribution $\mu=0$; $\sigma=1$, where its conversion coefficient becomes $x+=(x-\mu)/\sigma$. Normalization or standardization can eliminate detrimental effect arising from abnormal data, making all indicative values at the same quantitative level such that they are more comparable to each other and the accuracy of the discriminator can be greatly enhanced.

Since the image data of T1w-MRI, T2w-MRI and CE-MRI from different patients are scanned in sequence on the same day, the extracted features from the three types of sequence images have been aligned without an additional image mapping. The model training module 130 randomly takes 70% of patients' MRI data (training dataset) for performing model training, whereas the remaining 30% of patients' MRI data (internal evaluation dataset) is used for internal evaluation. In these embodiments, external dataset obtained from NPC patients of two external medical institutions are used for external (generalizability) evaluation 142. After the external evaluation, the external dataset will be fed into the trained MMgSN-Net (i.e., MHgDN-Net) by the virtual image generation module 140 for generation of the VCE-MRI.

As described herein, MMgSN-Net is used for model training according to certain embodiments. In other embodiments, other neural network or models can be used for model training. To evaluate the model training by MMgSN-Net, MRI data from NPC patients are used to carry out a series of evaluations. The synthesized images by MMgSN-Net are quantitatively evaluated with respect to GBCA enhanced T1w-MRI based on a series of evaluating metrics including, but not limited to, mean absolute error (MAE), mean squared error (MSE), structural similarity index (SSIM), and peak signal-to-noise ratio (PSNR), which results reveal that MMgSN-Net is capable of synthesizing a substantially real VCE-MRI.

The MMgSN-Net is also subjected to qualitative evaluation by visual inspection of the ground truth (CE-MRI) and synthesized (VCE-MRI) images. The results reveal that MMgSN-Net is better in terms of model performance over the existing neural networks such as CycleGAN, U-Net, and Hi-Net.

Figure 2:
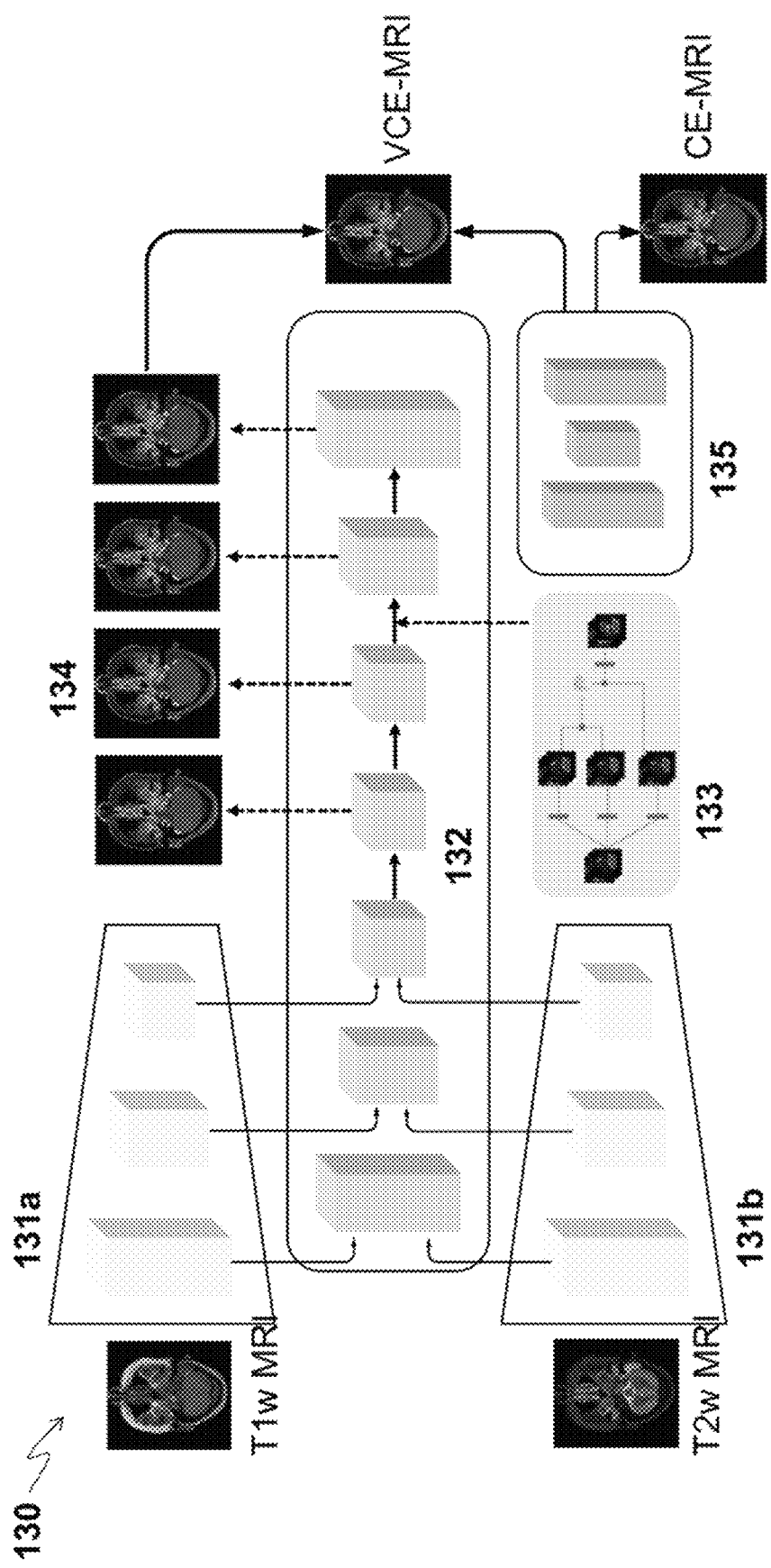
FIG. 2 schematically depicts a model training module of the present system based on multimodality-guided synergistic neural network (MMgSN-Net) according to certain embodiments.

FIG. 2 illustrates an architecture of the model training module 130 according to certain embodiments built based on MMgSN-Net, where it includes multimodality learning modules (131a, 131b), synthesis network 132 comprising one or more synergistic guidance systems (SGS), self-attention module 133, multi-level module 134, and discriminator 135. Initially, T1w-MRI and T2w-MRI are inputted into two separate channels (131a, 131b) of the multimodality learning modules. In certain embodiments, each channel of the multimodality learning modules (131a, 131b) comprises a plurality of convolution blocks and pooling layers. The convolution layers of the convolution blocks are followed by batch normalization to standardize extracted features using the mean and standard deviation thereof. Non-linearity is introduced into the extracted features after normalization. Learned features are downsampled using 2×2 max-pooling layers. Extracted information from T1w- and T2w-MRI will be fused by two SGS of the synthesis network 132 incorporated with 64, 128 and 256 features from three different convolution blocks of the multimodality learning modules, respectively.

The SGS of the synthesis network 132 according to certain embodiments is configured for leveraging complementary information between two imaging modalities in a synergistic manner. One of the common strategies to fuse learned information from the multimodality learning modules is to directly concatenate the information to different channels as input. Alternatively, in certain embodiments of the present invention, different fused features are generated by pixel-wise summation, pixel-wise product, and pixel-wise maximization separately, concatenated thereof as different channels, followed by subjecting the fused features back to the corresponding convolution layer to adaptively select useful complementary information for final VCE-MRI synthesis.

Different from a previous work by Zhou et al. (Hi-Net: Hybrid-fusion network for multimodal MR image synthesis. *IEEE Trans Med Imaging* 2020; 39:2772-2781), the SGS of the synthesis network 132 can communicate with each other. In certain embodiments, after each round of fuse operation, the corresponding features output from the SGS containing both T1w- and T2w-MRI information are fed back to a subsequent convolution block of the multimodality learning module. In this way, one modality of the multimodality learning module can learn information from the other modality, while the power of each individual channel of the multimodality learning module can be reduced by communication and cooperation among two different modalities. There are only two pooling layers in the multimodality learning module for optimizing the size of the features output from each of the first and second SGS, respectively. In addition, to avoid removal of critical information before feature fusion, extracted features from multimodality learning module 131 are preferably fed into the SGS of the synthesis network 132 without any pooling operation. In certain embodiments, the number of filters for the first and second SGS are 128 and 128, and 128 and 256, respectively, where the size of each filter is 3×3.

Since the nature of NPC tumors is highly aggressive, which is possible to invade adjacent healthy tissues such as neural structures and even bones of the corresponding skull base, synthesis of virtual CE-MRI data involves capturing large structure information of infiltrative tumor and/or different image regions. To maintain high computational efficiency without varying the number of convolution layers or the size of the convolution kernels, the self-attention module 133 is introduced between the second and third convolution blocks of the synthesis network 132 according to certain embodiments to capture the large size information across multiple image regions. The self-attention module 133 can be any conventional self-attention generative adversarial network such as the one proposed by Zhang et al. (*Proceedings of the 36th International Conference on Machine Learning*, 97:7354-7363, 2019).

To improve the image segmentation and edge detection performances of the deep learning model which are critical in distinguishing tumor from surrounding normal tissues, the multi-level module 134 is incorporated into the model learning module 130 according to certain embodiments to aggregate multi-level features by upsampling features output from the convolution layers of the synthesis network 132 to the size of the final synthetic image, followed by fusing the upsampled features through concatenation operation. A 1×1 convolution layer is applied for final VCE-MRI generation.

Figure 7:
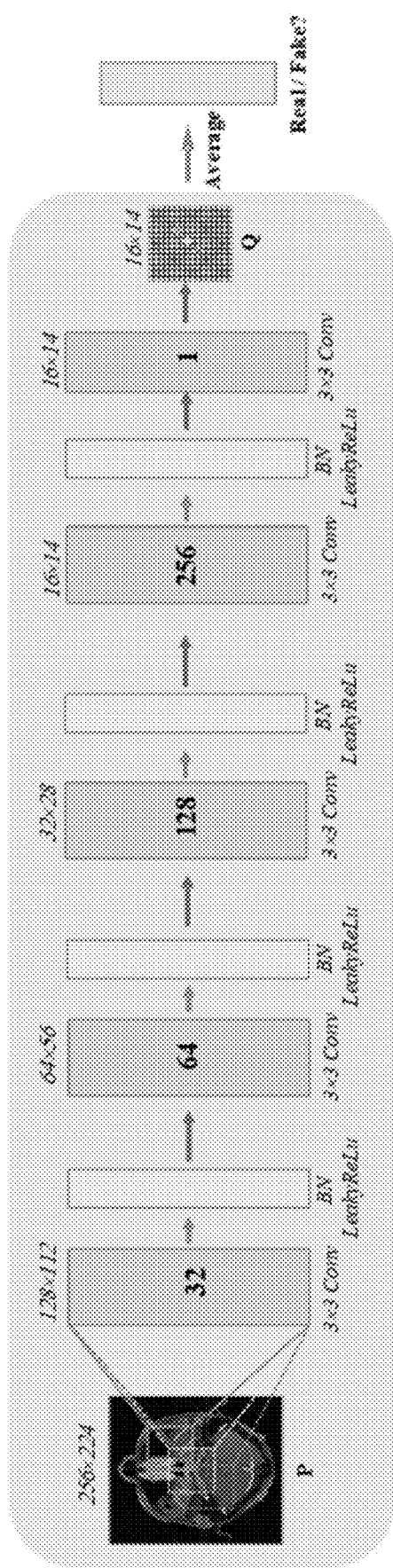
FIG. 7 schematically depicts an overall structure of a discriminator of the MMgSN-Net according to certain embodiments of the present invention.

To minimize the difference between the "real" or ground truth (CE-MRI) and "fake" or virtual (VCE-MRI) images, the discriminator 135 is incorporated into the model learning module 130 to improve the VCE-MRI synthesis performance through adversarial learning. The discriminator 135 can be any discriminator that classifies images on the basis of whether the input image patches are real or fake such as the one disclosed by Li et al. (2022). For example, the PatchGAN-based discriminator maps an input image P to a M×N size of an output image Q. All pixels in Q can be traced back to its receptive field, where the receptive field means the "patch" in P that needs to be classified. The final image authenticity is determined by averaging the M×N results in Q). In certain embodiments, the discriminator 135 comprises a plurality of convolution layers each convolution filter being in 3×3 size, batch normalization and Leaky Rectified Linear Unit (Leaky ReLu) layers each being arranged between two convolution layers. The input image P (two-dimensional axial slices) having a matrix size of 256×224 is used and linearly normalized to a range of [−1,1]. The output image Q will have a size of 16×14 matching the size of the final synthetic VCE-MRI. Mean square error (MSE) loss is used as the loss function of the PatchGAN-based discriminator for distinguishing real patches from fake patches and Adam algorithm is used to optimize the generated model according to certain embodiments. More details of the structure of PatchGAN-based discriminator are illustrated in FIG. 7 and the corresponding descriptions provided hereinafter.

Figure 3:
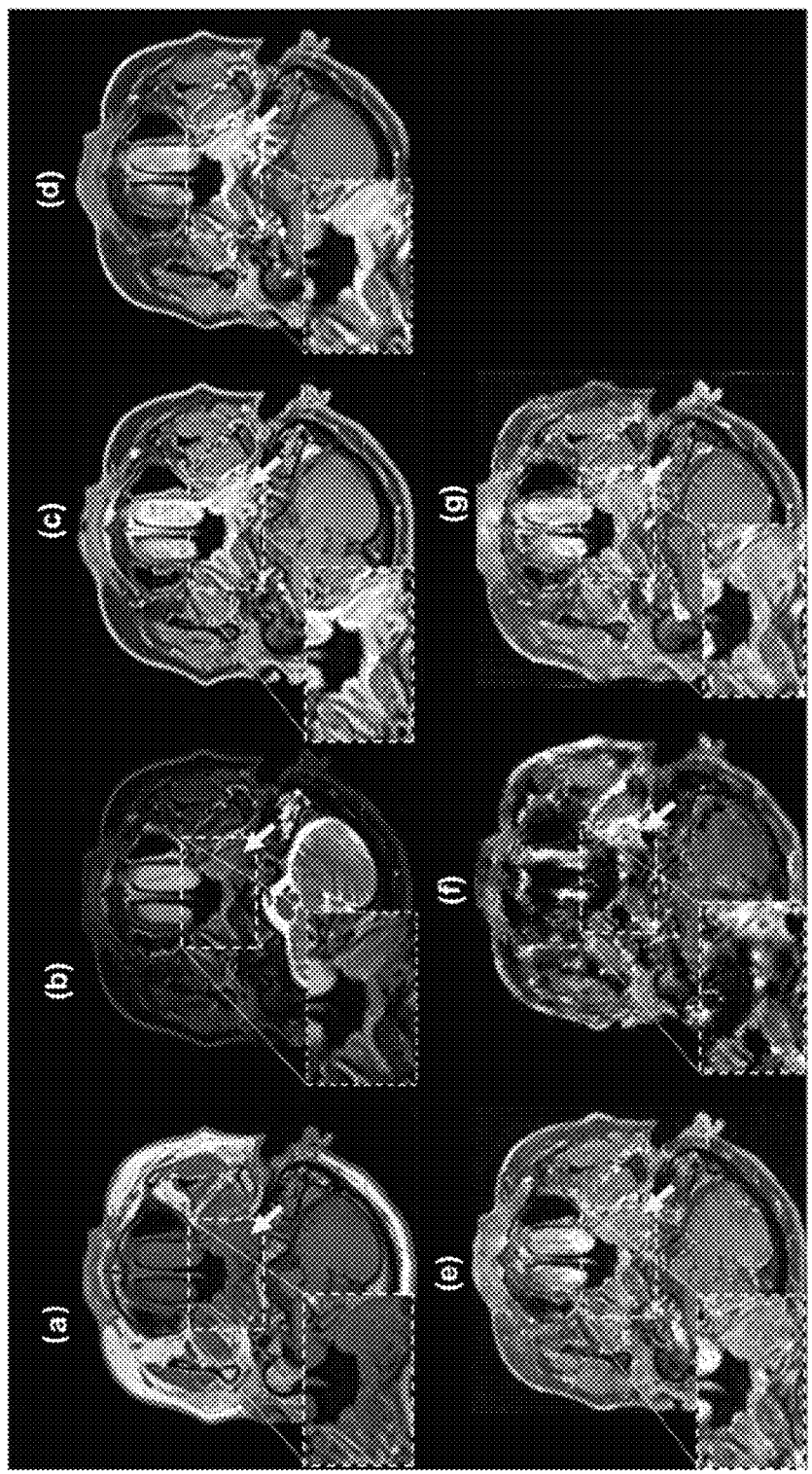
FIG. 3 shows a comparison between VCE-MRI generated by the present system according to the embodiments depicted in FIG. 1 based on external dataset and those generated based on a single medical institution, where:
 (a)-(c) show T1w, T2w, and CE-MRI from external dataset, respectively;
 (d) shows VCE-MRI generated by the present system according to the embodiments depicted in FIG. 1 based on the external dataset of (a)-(c);
 (e)-(g) show VCE-MRI generated based on a model trained by a corresponding training dataset obtained from each of the three medical institutions (hospital 1, hospital 2, and hospital 3, respectively)

Turning to FIG. 3, a visual comparison is provided between gadolinium-free contrast-enhanced MRI (GFCE-MRI) generated from MMgSN-Net trained by single-hospital dataset and VCE-MRI generated from MHDgN-Net trained by dataset composed of multi-hospital MRI data including those from three affiliated hospitals (Hospitals 1-3) and one external hospital (Hospital 4). The images of (a)-(c) in the top row of FIG. 3 are T1w-, T2w-, and CE-MRI from one of those affiliated hospitals, while (d) in the top row is the VCE-MRI generated by the MHDgN-Net according to various embodiments described herein including those depicted in FIGS. 1 and 2. As compared to the GFCE-MRI generated by MMgSN-Net based on the single-hospital dataset from each of the three affiliated hospitals, i.e., the images of (e) to (g) in the bottom row of FIG. 3, respectively, the VCE-MRI by the MHDgN-NET as shown in (d) is much closer qualitatively to real (CE-MRI) image (the image of (c)), especially in the tumor region. To further compare quantitatively, MAE, MSE, SSIM and PSNR between the CE-MRI from each of the three affiliated hospitals and VCE-MRI generated by the MHDgN-Net according to certain embodiments are calculated. The results are summarized in Table 2.

TABLE 2

| Training | Testing | MAE ± SD | MSE ± SD | SSIM ± SD | PSNR ± SD |
|---|---|---|---|---|---|
| Hospital 1 | Hospital 1 | 51.69 ± 8.59 | 8677.89 ± 2777.64 | 0.87 ± 0.03 | 33.42 ± 1.84 |
|  | Hospital 2 | 134.21 ± 27.77 | 39147.71 ± 12768.18 | 0.54 ± 0.08 | 26.83 ± 1.49 |
|  | Hospital 3 | 70.22 ± 11.63 | 15827.29 ± 5844.26 | 0.77 ± 0.03 | 30.75 ± 1.46 |
|  | *Hospital 4* | *95.98 ± 22.12* | *23869.40 ± 9309.05* | *0.72 ± 0.05* | *28.93 ± 1.56* |
| Hospital 2 | Hospital 1 | 125.89 ± 13.93 | 39842.89 ± 7569.25 | 0.70 ± 0.03 | 30.09 ± 0.96 |
|  | Hospital 2 | 20.52 ± 7.36 | 1947.33 ± 1236.10 | 0.96 ± 0.02 | 44.10 ± 3.13 |
|  | Hospital 3 | 84.49 ± 27.72 | 25728.04 ± 14925.70 | 0.80 ± 0.06 | 32.78 ± 2.53 |
|  | *Hospital 4* | *104.18 ± 39.18* | *35227.50 ± 23466.50* | *0.76 ± 0.08* | *31.61 ± 3.51* |
| Hospital 3 | Hospital 1 | 76.38 ± 8.86 | 17886.61 ± 3898.11 | 0.78 ± 0.03 | 29.51 ± 0.96 |
|  | Hospital 2 | 78.97 ± 20.23 | 15948.57 ± 6384.03 | 0.73 ± 0.07 | 30.15 ± 1.84 |
|  | Hospital 3 | 48.17 ± 12.88 | 10505.94 ± 4876.74 | 0.86 ± 0.04 | 32.30 ± 1.97 |
|  | *Hospital 4* | *72.14 ± 23.76* | *17400.50 ± 11190.67* | *0.81 ± 0.04* | *29.25 ± 2.72* |
| MHDgN-Net | Hospital 1 | 53.38 ± 7.91 | 9451.38 ± 2737.11 | 0.87 ± 0.02 | 32.94 ± 1.36 |
|  | Hospital 2 | 17.45 ± 6.16 | 1565.58 ± 1071.32 | 0.86 ± 0.04 | 31.81 ± 3.10 |
|  | Hospital 3 | 48.23 ± 13.27 | 10408.60 ± 4817.63 | 0.85 ± 0.04 | 31.31 ± 2.00 |
|  | *Hospital 4* | *68.60 ± 19.68* | *15384.84 ± 7870.72* | *0.87 ± 0.04* | *34.71 ± 2.24* |

N.B.: Italics represent external hospital results; underlined numbers represent the best result achieved in each hospital data As seen in Table 2, the MHDgN-Net achieved comparable internal quantitative results on all internal (affiliated hospitals) hospital dataset with respect to the models trained by single hospital dataset. The lower the MAE and MSE are, or the higher the SSIM and PSNR are, the higher is the generalizability of the neural network/model. The results show that models trained by single-hospital dataset can perform well on training internal hospital data, but with poor generalizability to other hospital images. On the other hand, the MHDgN-Net has higher generalizability against different single-hospital dataset trained models. MHDgN-Net also achieved the best result on external hospital dataset (Hospital 4) compared to those trained by single-hospital dataset (Hospitals 1-3). The model trained by Hospital 2 dataset is better than the other two models trained by single-hospital dataset (Hospitals 1 and 3) because Hospital 2 dataset has relatively smaller intensity value than the other two single-hospital datasets.

FIG. 4 depicts an architecture of the present system according to other embodiments than those depicted in FIG. 1. Similar to the system depicted in FIG. 1, the system 200 depicted in FIG. 4 also includes a data acquisition module 210, a data pre-processing module 220, a model training module 230, and a virtual image generation module 240. An additional module which is not present in the embodiments depicted in FIG. 1 is a data matching module 250. In the system 200, before feeding into the trained MHDgN-Net, one or more external datasets from at least two different external hospitals 252 are configured by the data matching module 250 to match the configuration of the training dataset in terms of their respective mean pixel value in order to minimize intensity variation of the external dataset, thereby increasing generalizability of the MHDgN-Net. The MHDgN-Net is trained by the training dataset obtained from 70% of the MRI data from multiple affiliated hospitals after being resampled and normalized by the data pre-processing module 220. The remaining 30% of the multi-hospital MRI data will be used for internal evaluation of the MHDgN-Net 230 after model training by the model training module 230. Since MRI data obtained from different hospitals have different statistical characteristics such as pixel intensity and range, mean value, and standard deviation etc., their data distribution patterns are different. Thus, the mean pixel value of the external dataset 252 matches the mean pixel value of the training dataset by the data matching module 250 to generate a matched external dataset 254 with a lower intensity variation. The matched external dataset 254 is then fed into the virtual image generation module 240 to generate the VCE-MRI. The matching of the external dataset with the training dataset can be computed by the equation (1) described hereinabove, in which the overall mean pixel value µ1 of the training dataset is determined by initially obtaining a mean pixel value of MRI data of each patient in the training dataset, followed by averaging the mean pixel values of all patients from the training dataset; the overall mean pixel value µ2 is determined by initially obtaining a mean pixel value of MRI data of each patient in the external dataset, followed by averaging the mean pixel values of all patients from the external dataset. The matched pixel value y of the MRI data from the external dataset after matching 254 is determined by multiplying the pixel value x of the MRI data of the external dataset 252 by the ratio of the overall mean pixel values between the training and external datasets (µ1/µ2). It should be understood by a skilled artisan that the matching mechanism described herein is just one of the implementation embodiments of the present invention. Other possible matching mechanisms that can reduce the intensity variation of the external dataset can also apply to the data matching module 250. In addition, only T1w-MRI and T2w-MRI data of the external dataset 252 are required to match the corresponding data of the training dataset, therefore only T1w-MRI and T2w-MRI data from the training dataset are inputted into the present system for model training while CE-MRI data from the training dataset are disregarded. The matched external dataset 254 has the same mean pixel value as that of the training dataset such that the data distribution variation of the original external dataset 252 can be minimized, in turn minimizing the difference between the external dataset 252 and the training dataset, thereby increasing the generalizability of the trained MHDgN-Net.

Figure 5:
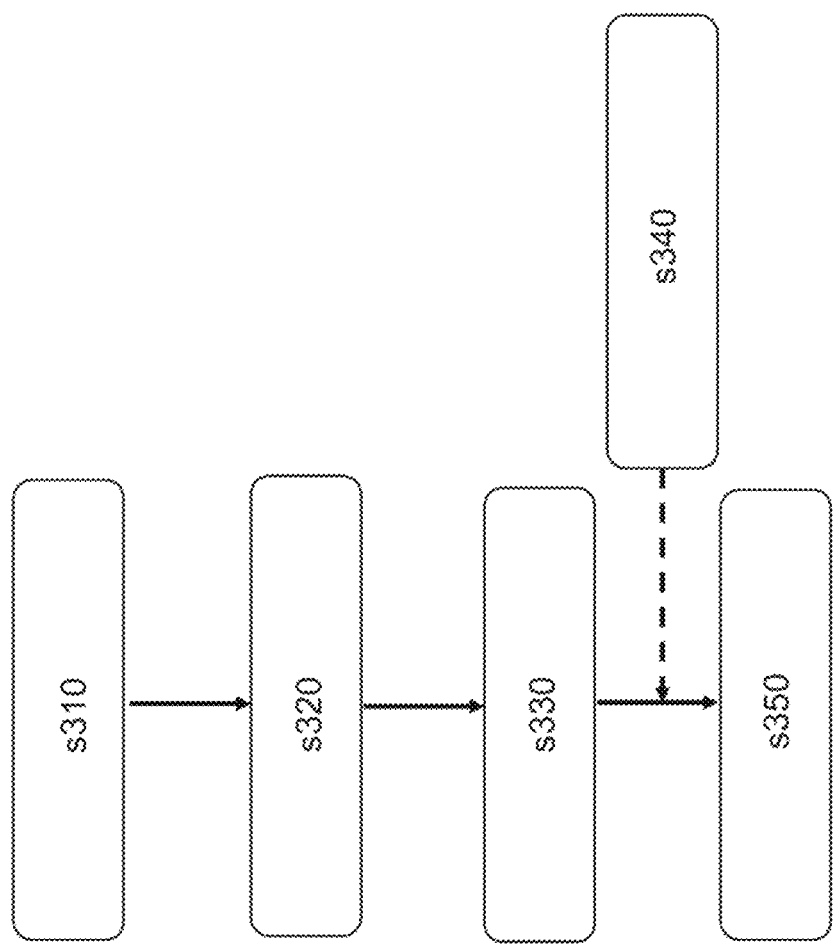
FIG. 5 shows a flowchart of the present methods according to various embodiments.

FIG. 5 summarizes how the present system is trained and optimized for generating virtual contrast-enhanced MRI from multiple medical institutions' MRI data in a general flowchart. Initially, MRI data are acquired from two or more medical institutions (s310), where the MRI data include contrast agent-free T1w-MRI, T2w-MRI data, and contrast-enhanced MRI (CE-MRI) data. The acquired MRI data are subjected to pre-processing (s320), where the pre-processing s320 includes resampling the acquired MRI data and normalizing or standardizing the resampled MRI data. The pre-processed MRI data are then partially selected for forming a training dataset, while the remaining of the pre-processed MRI data are used for internal evaluation (s330), where the selected MRI data for forming the training dataset is about 70% of the pre-processed MRI data which include some of the T1w-, T2w-, and CE-MRI data, in which the T1w- and T2w-MRI data are inputted as two separate modalities into a multimodality-guided synergistic neural network (MMgSN-Net) for model training whereas the CE-MRI data of the training dataset is used only as the learning target. External dataset formed by contrast agent-free MRI data from one or more external medical institutions other than the at least two medical institutions mentioned in s310 are used for generation of virtual contrast-enhanced MRI (VCE-MRI) data. Preferably, a data matching process is performed on the external dataset with respect to the training dataset (s340) before feeding the external data for VCE-MRI generation s350 to increase the generalizability of the trained neural network/model.

To increase the accuracy of the trained model, the training dataset and external dataset can be varied to include more clinically relevant data such as different tumor stages, morphologies, and sizes of different patients and/or different types of tumors.

In certain embodiments, an additional classification network may be incorporated into the present system to decide whether a patient or a population of patients is suitable for being assessed by contrast agent-free, virtual contrast-enhanced MRI generated by the present system. For instance, the performance of deep learning neural network in the clinical application may be affected by the size and/or morphology of some rarely seen tumors, or the initial training dataset of the present invention does not include the data of the relevant cases to these rarely seen tumors, or the volume of available clinical data of these rarely seen cases is limited. If this kind of deep learning neural network is directly applied in clinical evaluation of these patients, the corresponding MRI data from them could not be considered and effectively enhanced by such neural network. Thus, the introduction of the classification network can screen out these rarely seen cases such that the reliability of these VCE-MRI data can be increased.

From the perspective of data acquisition, the generalizability of the present neural network/model can be improved by increasing the diversity of the training data such as increasing the number of medical institutions, including more types of MRI scanner, utilizing a number of clinically applicable imaging and scanning parameters, etc.

From the perspective of data matching, the generalizability of the present neural network/model can be improved by matching the data distribution of the external dataset with that of the training dataset, in turn decreasing the distribution variation between the external and training datasets.

A better performance on the external dataset by the present neural network/model trained with an expanded training dataset and a decreased variation between the external and training datasets is observed, suggesting that the present invention is more generalizable and suitable for MRI data of external medical institutions compared to the models trained by dataset from single medical institution.

It should be understood that the above embodiments and examples are intended to assist the illustration of the present invention, but should not be considered to limit the scope of the present invention. Any neural network or model within the knowledge of an ordinary skilled artisan in the relevant field that are able to generate contrast agent-free, virtual contrast-enhanced MRI based on T1w- and T2w-MRI data as training dataset and CE-MRI as learning target with a data distribution mapping between external and training datasets without departing the objectives and spirit of the present invention should also fall within the scope of the present invention and be used to enable the present invention.

The following descriptions further illustrate how the present system is established, trained and modified according to certain embodiments and its performance in tumor delineation as various examples and be supported by corresponding experiments and comparative results, which should not be considered to limit the scope of the present invention thereto.

Examples

In the following examples, the architecture of multimodality-guided synergistic neural network (MMgSN-Net)

capable of optimizing complementary features between multiparametric MR modalities, including contrast-free T1w and T2w images, for VCE-MRI synthesis, and its performance in terms of effectiveness with respect to some state-of-art deep learning (DL) models via a series of evaluating metrics will be illustrated. The authenticity of the synthesized VCE-MRI images was assessed by seven board-certified radiation oncologists from four hospitals via Turing tests. Corresponding MRI data from NPC patients of four hospitals were used.

(A) Patient Data:

Multi-parametric MR images, including T1w, T2w and CE-MRI, were retrospectively retrieved from 64 biopsy-proven (stages I-IVb) NPC patients who received RT at Hong Kong Queen Mary Elizabeth Hospital between 2012 and 2016. Patient consent was waived due to the retrospective nature of this study. All MR images were acquired under a 1.5 Tesla MRI scanner (Avanto, Siemens, Germany). Acquisition parameters for the T1w and CE-MRI include: repetition time (TR): 562-739 ms; echo time (TE): 13-17 ms; matrix: 256-320; slice thickness: 3.3-4.0 mm; voxel size 0.75-0.94 mm. In particular, the CE-T1w MR images were acquired less than 30 seconds post GBCA injection (Gd-DOTA, 0.2 ml/kg). The T2w MR images were acquired using the short tau inversion recovery (STIR) sequence with the following acquisition parameters: TR: 7640 ms; TE: 97 ms; inversion time: 165 ms; matrix: 320; slice thickness: 4.0 mm; voxel size 0.75 mm.

(B) MMgSN-Net Architecture:

The multimodality-guided synergistic neural network (MMgSN-Net) was configured for VCE-MRI synthesis. The MMgSN-Net consists of five key modules: (i) multimodality learning module, (ii) synergistic guidance system (SGS), (iii) self-attention module, (iv) multi-level module, and (v) discriminator. FIG. 6 illuminates the overall architecture of the MMgSN-Net. Detailed descriptions of each module are presented as follows:

Multimodality Learning Module (601):

This module was devised to unravel tumor-related imaging features from each of the input MR modalities, overcoming the limitation of single modality-based VCE-MRI synthesis. As indicated in FIG. 1, it contains two channels for the two studied imaging modalities (T1w and T2w), each channel consists of three convolution blocks and two pooling layers. The convolution layers inside the convolution blocks are followed by batch normalization to standardize the extracted features using the mean and standard deviation of the extracted features. After batch normalization, the activation function LeakyRelu was utilized to introduce non-linearity into the extracted features. The learned features were downsampled using 2×2 max-pooling layers. To fuse the extracted information from T1w and T2w modalities, we generated 64, 128, and 256 features from the first, second, and third convolution block, respectively.

Synergistic Guidance System (SGS) (602):

This component was specifically designed for leveraging complementary information between the two studied imaging modalities in a synergistic manner.

To fuse the learned information from multimodality learning modules, a common strategy is to directly concatenate the information to different channels as input. Alternative combination methods include pixel-wise summation, pixel-wise product, and pixel-wise maximization. Similar to a previous work by Zhou et al. (Hi-Net: Hybrid-Fusion Network for Multi-Modal MR Image Synthesis. *IEEE Trans Med Imaging.* 2020; 39(9): 2772-2781), pixel-wise summation, pixel-wise product, and pixel-wise maximization were first used separately to generate different fused features. Subsequently, the fused features were concatenated as different channels, followed by subjecting to a convolution layer to adaptively select useful complementary information for final VCE-MRI synthesis.

However, there are several differences between the present SGS and Zhou's. Firstly, in Zhou's work, separate information extractors learn the features from each input modality individually, and the extractors cannot communicate with each other, which may limit complementary information learning. In contrast, as inspired by the knowledge distillation concept where a master network modulates the learning activity of an assistant network, the present SGS was used as a supervisor to fuse the learned information from each modality, and after the fuse operation, the output features from the present SGS contained both T1w- and T2w-MRI data. The fused information was fed back to the next convolution block of the multimodality learning module to guide complementary information selection. In this way, the multimodality learning module can aware the information from the other modality, and the power of each individual multimodality learning module was further harnessed by communication and cooperation among the two modules in learning the complementary information for VCE-MRI synthesis. The fused features were not only fed directly back to the second convolution block of each input channel in the multimodality learning model, but also sent to the third convolution block via the adoption of an additional pooling layer optimizing the size of output features from the first SGS. Secondly, the present MMgSN-Net contained only two SGSs and two pooling layers that fuse and downsample the extracted features, acting as the encoders of the synthesis network. The size of the SGS filters is 3×3, and the number of filters for the first and second SGS was 128 & 128, and 128 & 256, respectively. Thirdly, the extracted features from the multimodality learning module was fed into the SGS without any pooling operation to avoid removal of critical information prior to feature fusion.

Self-Attention Module (603):

In a convolutional neural network, large-size tissues across intra-slice image regions are captured by the convolution operator. As the field of the convolution operator is merely locally receptive, optimization algorithms may encounter difficulty in searching for the optimum parameter values when capturing the large-size tissues. To this end, there may be two solutions: either using multiple convolution layers or increasing the size of the convolution kernels. However, both solutions would degrade the computational efficiency. A balance between the ability to capture the large size information and the computational efficiency can be achieved by a self-attention mechanism, which calculates the response at a position as a weighted sum of the features at all positions.

Since NPC tumors can be highly aggressive, which presents a high tendency to invade nearby healthy tissues like neural structures and bony skull base, and the size of tumor can be large and exists across different image regions, if the MMgSN-Net is provided with limited convolutional kernel size only for VCE-MRI synthesis from these NPC tumor images, the algorithms will encounter difficulty in capturing this large structural information, for example, the shape of infiltrative tumor. Therefore, a self-attention module was introduced into the MMgSN-Net to capture the large size information across image regions, enabling MMgSN-Net to faithfully preserve the shape of large anatomic structures. The self-attention module was inserted between the second and third convolution block of the synthesis network decoder, and it may be in the same configuration as that in Zhang et al. (Self-Attention Generative Adversarial Networks. In: *International Conference on Machine Learning*. PMLR; 2019; 7354-7363).

Multi-Level Module (604):

Multi-level feature integration has been widely applied in areas of image segmentation and edge detection. Several studies have shown that integrating features from multiple deep layers can improve the performance in image segmentation and, more remarkably, in edge detection. In VCE-MRI synthesis, edge information is critical for discriminating the tumor from surrounding normal tissues. Thus, a multi-level module was utilized in this model to aggregate the multi-level features. In MMgSN-Net, upsampling for the output features was performed on each side of the decoders to the size of the output image. Subsequently, the upsampled features were fused through a concatenation operation and a 1×1 convolution layer was used for final output generation.

Discriminator (605):

A discriminator was utilized in MMgSN-Net to distinguish synthetic images from real CE-MRI, thus to improve the VCE-MRI synthesis performance through adversarial learning. An overall structure of the discriminator is illustrated in FIG. 7, which was a "PatchGAN"-based discriminator that classifies input images based on whether the image patches are real or fake (i.e., synthetic). Different from regular GAN discriminator that maps an input image to single "real" or "fake" output, the PatchGAN-based discriminator mapped an input image P to a M×N size output Q (M=16, N=14), all pixels in Q were labelled as "real" (for real input P) or "fake" (for synthetic input P). For each pixel in Q, it can be traced back to its receptive field, where the "receptive field" herein means the "patch" that needs to be classified (for example, the dotted patches in P). The final image authenticity was determined by averaging the M×N results in Q. One advantage of the PatchGAN-based discriminator is that it has fewer parameters than a full image discriminator. The batch normalization momentum was set as 0.8 and the LeakyReLu slope was set as 0.2. For the first four convolutional layers, the filter stride was set to 2 and padding was set to 1.

(C) Implementation Details of MMgSN-Net on VCE-MRI Synthesis from NPC Tumor MR Images:

All the T1w, T2w and CE-MRI images for each NPC patient acquired for radiotherapy purpose were well-aligned. Rigid registration was applied to fine-tune the alignment, when necessary. Triangle thresholding was performed to eliminate background noise from all MR images, which may otherwise be mistakenly learned by the deep learning network and lead to model performance degradation. A total of 35 patients were used for model training, whereas 29 patients were employed for model testing. Two-dimensional axial slices with a matrix size of 256×224 were adopted to acquire knowledge information from the T1w and T2w images for mapping the CE-MRI. Prior to model training, all images were linearly normalized to a range of [−1,1]. The T1w and T2w MR images were used as inputs to the network, and the CE-MRI was used as learning targets.

The L1 loss between the synthetic VCE-MRI and the corresponding real GBCA-enhanced CE-MRI was deployed as a loss function of the synthesis network (SGS). Mean square error (MSE) loss was used as the loss function of the PatchGAN-based discriminator for distinguishing between real and fake patches. The Adam algorithm was utilized to optimize the generated model. The network was trained under a fixed learning rate of 0.0002 with 200 epochs, with the batch size of 1. The code was implemented in the PyTorch library using an NVIDIA RTX 3090 graphic card.

(D) Model Evaluation:

The effectiveness of the MMgSN-Net was assessed quantitatively using four widely adopted evaluating metrics in the areas of medical imaging synthesis including mean absolute error (MAE), mean squared error (MSE), structural similarity index (SSIM), and peak signal-to-noise ratio (PSNR) and compared against three state-of-the-art image synthesis networks: CycleGAN (Zhu et al., Unpaired Image-To-Image Translation Using Cycle-Consistent Adversarial Networks. In: *Proceedings of the IEEE International Conference on Computer Vision and Pattern Recognition*; 2017:2223-2232), Hi-Net (Zhou et al., 2020), and U-Net (Ronneberger and Fischer, U-Net: Convolutional Networks for Biomedical Image Segmentation. In: Navab N, Hornegger J, Wells W M, et al., eds. *Medical Image Computing and Computer-Assisted Intervention—MICCAI* 2015. Lecture Notes in Computer Science. Cham: Springer International Publishing; 2015: 234-241). These evaluating metrics can be expressed by the following equations:

$$MAE = \frac{1}{N}|y(x) - g(x)|, \qquad [3]$$

$$MSE = \frac{1}{N}(y(x) - g(x))^2, \qquad [4]$$

$$PSNR = 10\log_{10}\left(\frac{L^2}{MSE}\right), \qquad [5]$$

$$SSIM = \frac{(2\mu_{y(x)}\mu_{g(x)} + c1)(2\sigma_{y(x)g(x)} + c2)}{(\mu_{y(x)}^2 + \mu_{g(x)}^2 + c1)(\sigma_{y(x)}^2 + \sigma_{g(x)}^2 + c2)}, \qquad [6]$$

where N is the number of pixels in each image slice; y(x) and g(x) denote the ground truth image and synthetic VCE-MRI, respectively. $\mu_{y(x)}$, $\mu_{g(x)}$ and $\sigma_{y(x)}$, $\sigma_{g(x)}$ are the means and variances of the ground truth image and the synthetic image, while $\sigma_{y(x)g(x)}$ is the covariance of y(x) and g(x). $c_1=(k_1L)^2$ and $c_2=(k_2L)^2$ are two variables used to stabilize the division by the weak denominator, and L is the dynamic range of the pixel values. Here, L=4095, $k_1$=0.01, and $k_2$=0.03 were set by default.

In this comparative study, the CycleGAN network which only supports single input channel was trained with a paired dataset by using T1w and T2w images separately (referred to as "CycleGAN_T1w" and "CycleGAN_T2w" in FIGS. 8I and 8J, respectively). U-Net, a network using a mirrored encoder-decoder architecture to acquire knowledge information for input-to-output image mapping, was inputted with T1w and Tw2 images separately (referred to as "U-Net_T1w" and "U-Net T2w" in FIGS. 8F and 8G, respectively) followed by combining both through different channels (referred to as "U-Net_T1w+T2w" in FIG. 8H). Hi-Net, a network sharing certain similarities with those of MMgSN-Net in that it allows for multiple inputs of different modalities and deploys two autoencoder-like structures to extract the modality-specific features, was trained with both T1w and T2w images as input (referred to as "Hi-Net" in FIG. 8E).

Qualitative evaluation of the synthetic VCE-MRI by the MMgSN-Net (FIG. 8D) was conducted by visually analyzing the same against the input T1w (FIG. 8A), T2w (FIG. 8B) and the ground truth CE-MRI (FIG. 8C) images. In particular, tumor regions were magnified (small insets (a)-(j)) for visual comparison. In addition, difference map between the ground truth CE-MRI and the synthesized VCE-MRI by the MMgSN-Net is constructed for visualizing uncertainties in relation to VCE-MRI synthesis (the results are shown in FIG. 9).

Lastly, the Turing test, a long-established test in areas of artificial intelligence for determining the capability of a machine to exhibit intelligent human behavior, was used to assess authenticity of the synthetic VCE-MRI by the MMgSN-Net. In that test, seven board-certified radiation oncologists from four hospitals participated in discriminating the synthetic VCE-MRI from the real CE-MRI. 5 patients were randomly chosen from the test set for the Turing test. For each patient, 10 tumor-bearing image slices were randomly selected (5 ground truth CE-MRI plus 5 paired synthetic VCE-MRI) and presented to the participating oncologists in a random order. The oncologists were blinded with respect to the relative proportions of ground truth and synthetic images. Additionally, the participants were asked to provide justifications when determining a synthetic case, such that potential limitations of the MMgSN-Net can be realized.

Table 3 summarizes the results of quantitative comparisons between the MMgSN-Net and the comparative state-of-the-art DL networks for both whole image and tumor regions, in aspects of MAE, MSE, PSNR, and SSIM. For MMgSN-Net, the mean (±standard deviation [SD]) of the MAE, MSE, PSNR, and SSIM for the synthesized VCEMRI relative to the ground truth CE-MRI were calculated to be 44.50±13.01, 9193.22±5405.00, 0.887±0.042, and 33.17±2.14 for whole image and 110.31±20.69, 25924.77±10385.70, 0.706±0.073, 28.74±1.52 for tumor regions, respectively. The MMgSN-Net significantly outperformed all the comparative networks in all studied aspects (p<0.05). Among the comparative state-of-the-art networks, on the other hand, U-Net obtained the best performance in all four evaluating aspects, while the CycleGAN models (both CycleGAN_T1w and CycleGAN_T2w) underperformed the others.

obtained following the injection of GBCAs (FIG. 8C) outperformed both the T1w and T2w images, clearly revealing the tumor structure and adjacent muscle texture.

In respect of the synthetic images generated from the U-Net models, they are relatively blurry throughout the images (FIGS. 8F-H). The tumor structure predicted by U-Net_T2w was more discernable than that obtained from U-Net_T1w (insets (g) and (f) in FIGS. 8G and 8F, respectively). The VCE-MRI synthesized U-Net images (FIG. 8H) achieved the best discriminability of tumor's morphology against the ground truth (FIG. 8C), compared to both U-Net_T1w and U-Net_T2w generated images (FIGS. 8F and 8G).

In respect of the Hi-Net predicted VCE-MRI (FIG. 8E), the overall image quality was visually comparable to the ground truth image (FIG. 8C). Nevertheless, the tumor-to-muscle interface was not in a good agreement compared with the ground-truth image (FIG. 8C), while the MMgSN-Net (inset (d) in FIG. 8D) achieved a satisfying approximation to the ground-truth image (inset (c) in FIG. 8C).

For the two CycleGAN models (insets (i) and (j) in FIGS. 8I and 8J, respectively), the tissue structures, such as the temporalis tendon and surrounding muscles, were the least discernable. Notably, the synthetic images predicted by the MMgSN-Net (FIG. 8D and inset (d)) visually yields the best approximation to the ground-truth images, in particular to the tumor-to-muscle interface and the texture information, outperforming all the comparing networks. These qualitative findings are well in line with the results of quantitative evaluation.

FIG. 9 visualizes difference maps between the real CE-MRI and synthetic VCE-MRI from different patients for visualizing uncertainties in relation to VCE-MRI synthesis by the MMgSN-Net. A difference map window with a range of [0, 0.2] was set to clearly visualize the differences. It can be observed that prediction uncertainties most occurred at the edges between anatomic structures. Besides, structures

TABLE 3

|  |  | MAE ± SD (↓) | MSE ± SD (↓) | SSIM ± SD (↑) | PSNR ± SD (↑) |
| --- | --- | --- | --- | --- | --- |
| U-Net_T1w | Whole image | 50.39 ± 13.70 | 11934.18 ± 5878.76 | 0.864 ± 0.042 | 31.91 ± 1.91 |
|  | Tumor regions | 127.20 ± 19.01 | 34168.37 ± 10137.90 | 0.637 ± 0.063 | 27.47 ± 1.23 |
| U-Net_T2w | Whole image | 47.32 ± 13.55 | 10474.32 ± 5591.32 | 0.877 ± 0.041 | 32.59 ± 2.18 |
|  | Tumor regions | 117.47 ± 20.11 | 29532.56 ± 9824.42 | 0.679 ± 0.068 | 28.17 ± 1.47 |
| U-Net_T1w + T2w | Whole image | 46.10 ± 13.15 | 9596.54 ± 5360.18 | 0.886 ± 0.042 | 32.95 ± 2.08 |
|  | Tumor regions | 112.89 ± 18.87 | 27218.09 ± 9711.72 | 0.700 ± 0.068 | 28.46 ± 1.33 |
| CycleGAN_T1w | Whole image | 64.79 ± 15.78 | 18198.07 ± 7790.22 | 0.799 ± 0.049 | 30.03 ± 1.83 |
|  | Tumor regions | 164.18 ± 15.41 | 53467.99 ± 9147.11 | 0.495 ± 0.042 | 25.45 ± 0.76 |
| CycleGAN_T2w | Whole image | 63.94 ± 15.48 | 17445.77 ± 7467.58 | 0.802 ± 0.042 | 30.21 ± 1.83 |
|  | Tumor regions | 156.84 ± 14.80 | 48520.38 ± 8652.91 | 0.514 ± 0.038 | 25.78 ± 0.77 |
| Hi-Net | Whole image | 51.19 ± 13.74 | 12088.02 ± 6098.83 | 0.862 ± 0.041 | 31.87 ± 1.94 |
|  | Tumor regions | 126.38 ± 19.36 | 34004.66 ± 10066.85 | 0.648 ± 0.061 | 27.42 ± 1.13 |
| MMgSN-Net | Whole image | 44.50 ± 13.01 | 9193.22 ± 5405.00 | 0.887 ± 0.042 | 33.17 ± 2.14 |
|  | Tumor regions | 110.31 ± 20.69 | 25924.77 ± 10385.70 | 0.706 ± 0.073 | 28.74 ± 1.52 |

N.B.: ↑ indicates that a larger number represents better performance; ↓ indicates that a smaller number represents better performance; MAE, mean absolute error; MSE, mean squared error; PSNR, peak signal-to-noise ratio; SSIM, structural similarity index; SD, standard deviation.

Overall, in comparison with the state-of-the-art networks, the MMgSN-Net achieved outstandingly, with mean MAE improvements of 13.07% versus the Hi-Net, 3.47% versus the multi-channel U-Net, 31.32% versus the CycleGAN_T1w, and 30.40% versus the CycleGAN_T2w.

Figure 8:
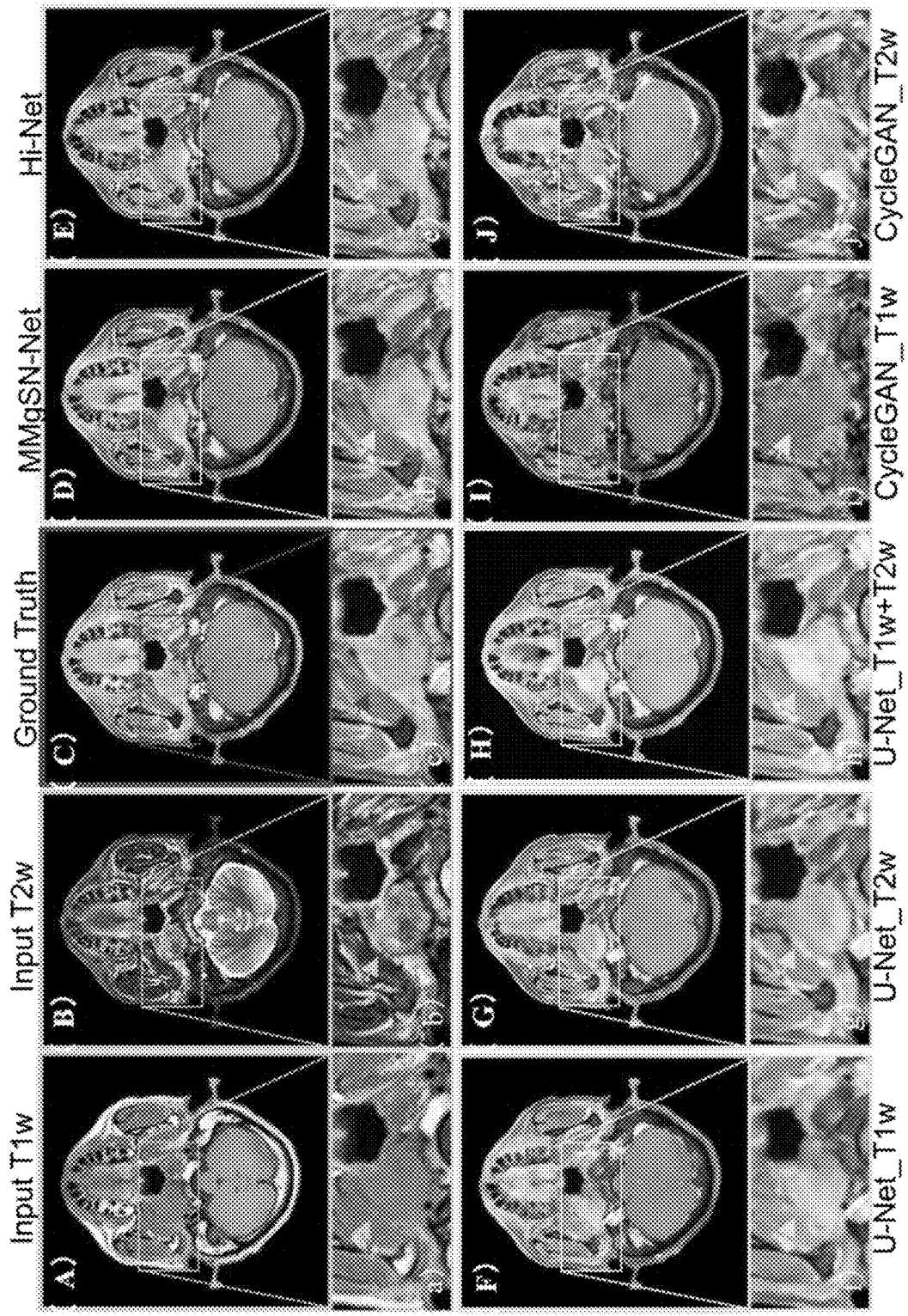
FIG. 8 shows a visual comparison between ground truth CE-MRI and synthesized VCE-MRI by the present system according to certain embodiments and other comparable deep learning networks, in which: (A) input T1w-MRI; (B) input T2w-MRI; (C) ground truth CE-MRI obtained after GBCA injection; (D) VCE-MRI synthesized by MMgSN-Net; (E) VCE-MRI predicted by Hi-Net; (F) VCE-MRI synthesized by U-Net (trained with T1w-MRI); (G) VCE-MRI synthesized by U-Net (trained with T2w-MRI); (H) VCE-MRI synthesized by U-Net (trained with both T1w and T2w-MRI); (I) VCE-MRI synthesized by CycleGAN (trained with T1w-MRI); (J) VCE-MRI synthesized by CycleGAN (trained with T2w-MRI); small insets (a) to (j) are magnified selected tumor region in the images shown in (A) to (J), respectively.
Figure 9:
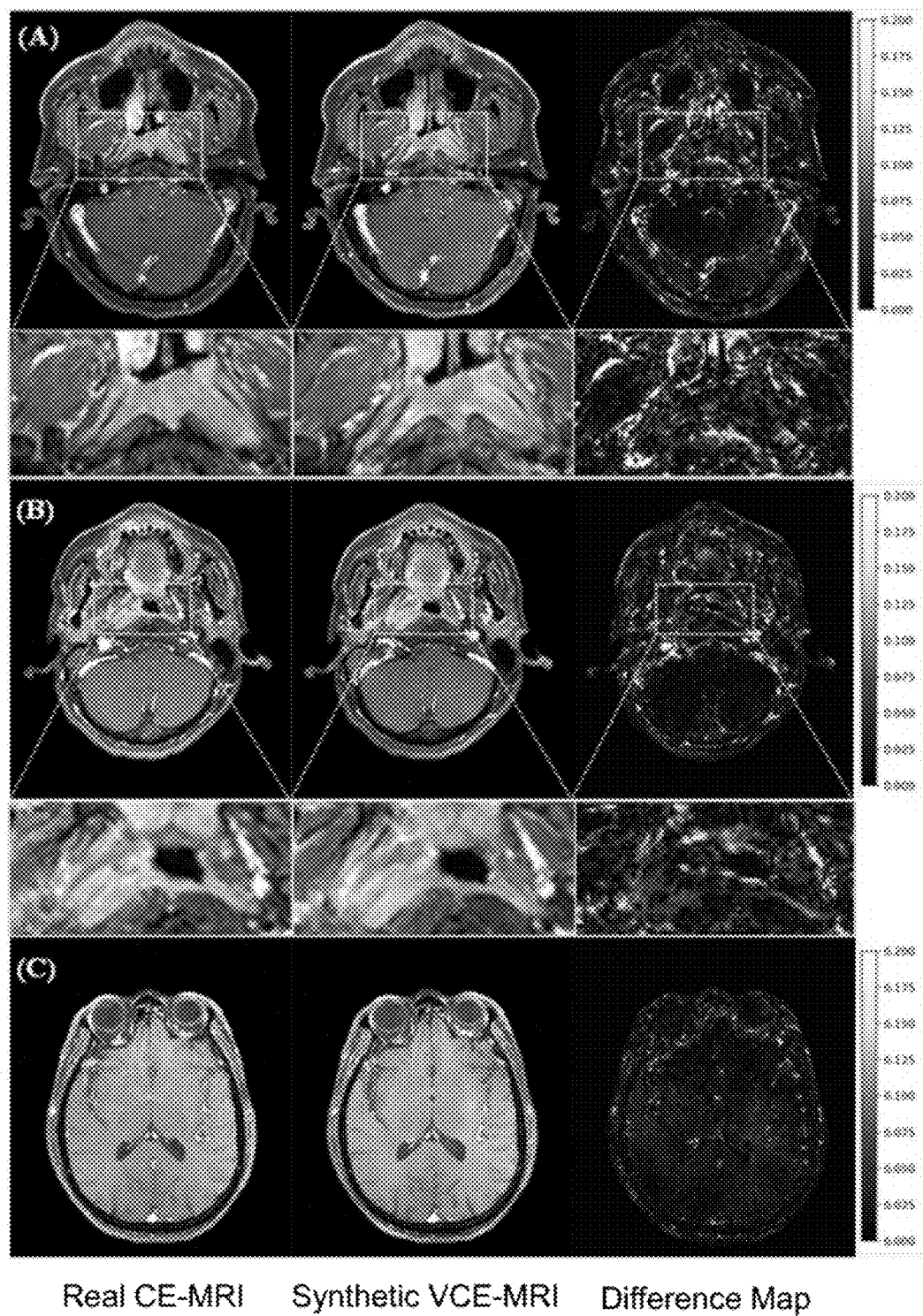
FIG. 9 shows a visual comparison by difference map between real CE-MRI (left column) and synthetic VCE-MRI (middle column) by MMgSN-Net according to certain embodiments; difference map is provided with a map window within a range of 0 to 0.2 was set (right column), in which: (A) to (C) represent different axial slices

As seen in FIG. 8, in T1w and T2w input images, the tumor structure and adjacent muscle texture were not clearly discernible in the input T1w MR image (FIG. 8A), while the tumor edge was clearer in the input T2w MR image (FIG. 8B). For tumor delineation, the ground truth CE-MRI of evenly-changing pixel values (such as the maxillary sinus and cerebellum) could be accurately predicted by the MMgSN-Net.

In summary, the results of the quantitative evaluations demonstrate that the MMgSN-Net outperformed all the comparing networks for both whole image and tumor regions (Table 3), yielding the top-ranked scores in averaged MAE (44.50±13.01, 110.31±20.69), MSE (9193.22±5405.00, 25924.77±10385.70), SSIM (0.887±0.042, 0.706±0.073), and PSNR (33.17±2.14, 28.74±1.52) for whole image and local tumor regions, respectively. This is in line with findings of our qualitative evaluation, where the synthetic images predicted by the MMgSN-Net (FIG. 8D and inset (d)) visually yielded the best approximation to the ground-truth images, in particular, to the tumor-to-muscle interface and the intra-tumoral texture information, outperforming all the comparing networks. Similar to the MMgSN-Net, both U-Net T1w+T2w and Hi-Net models deployed both T1w and T2w MR images as inputs for model training. A distinct difference of the present network from these two comparative networks lies to its capability to leverage complementary information between each of the unique input imaging modalities, rather than using a simple additive concatenation of different input modalities. This may shed some light on the outstanding performance of the MMgSN-Net, compared with the other two networks (Table 3). Besides, the U-Net yielded the second best-performing model among the studied networks, as indicated in Table 3. It was found that the synthetic images generated by U-Net were over-smoothed, leading to loss of detailed information, for instance, regarding the cerebellum and muscle texture, as illustrated in FIG. 8H. It could be partially attributed to the incapability of the L1 loss function for capturing high-frequency signals in MR images of NPC, where there are complex relationships among an ensemble of fine anatomic tissues in the nose-pharynx ministry. On the contrary, the CycleGAN gave rise to the worst model performance (Table 3). To a degree, this may be explained by the limitation of the backward cycle adopted in the CycleGAN network. Although the backward cycle has been used to maintain cycle consistency, it increased the number of training parameters, which may result in model underfitting given the small-sized training samples.

Intriguingly, it was observed that inputting single T2w MR images yielded better performance in both U-Net and CycleGAN networks than when using single T1w MR images (Table 3). A possible explanation would be related to the superiority of T2w MR images in revealing hyperintensity or inhomogeneity information on various pathologies, such as in peripheral edema and tumor necrosis, which makes T2w MR images contribute to more valuable information on pathology-related contrast enhancement for VCE-MRI synthesis, compared to contrast-free T1w MRI. This finding is also consistent with a brain tumor study conducted by Kleesiek et al. (2019), who reported that T2w MR images provided more useful information for VCE-MRI synthesis. Kleesiek et al. (2019) trained a 3D BayesUNet using multi-parametric MR modalities of 47 contrast-enhanced samples and obtained a mean SSIM of 0.862±0.029. Another work by Gong et al. (2018) reported a mean SSIM value of 0.85 □ 0.07 using a U-Net model that was trained on 10% GBCA-dose CE-MRI and contrast-free T1w MR images of 10 patients with brain diseases. In these models, information in different input modalities was simply concatenated into different channels without emphasis on potential interaction of features between the modalities. While satisfying in brain imaging, their models were deficient in leveraging complementary information between input imaging modalities, which could be more detrimental in the case of deeply infiltrative NPC. In comparison, the MMgSN-Net achieved a higher mean SSIM of 0.887±0.042 after training with 35 samples using both T1w and T2w MR images. To a large extent, this improvement in SSIM was mainly attributable to the capacity of the MMgSN-Net in unraveling complementary information from individual unique imaging modalities for VCE-MRI synthesis.

Figure 10:
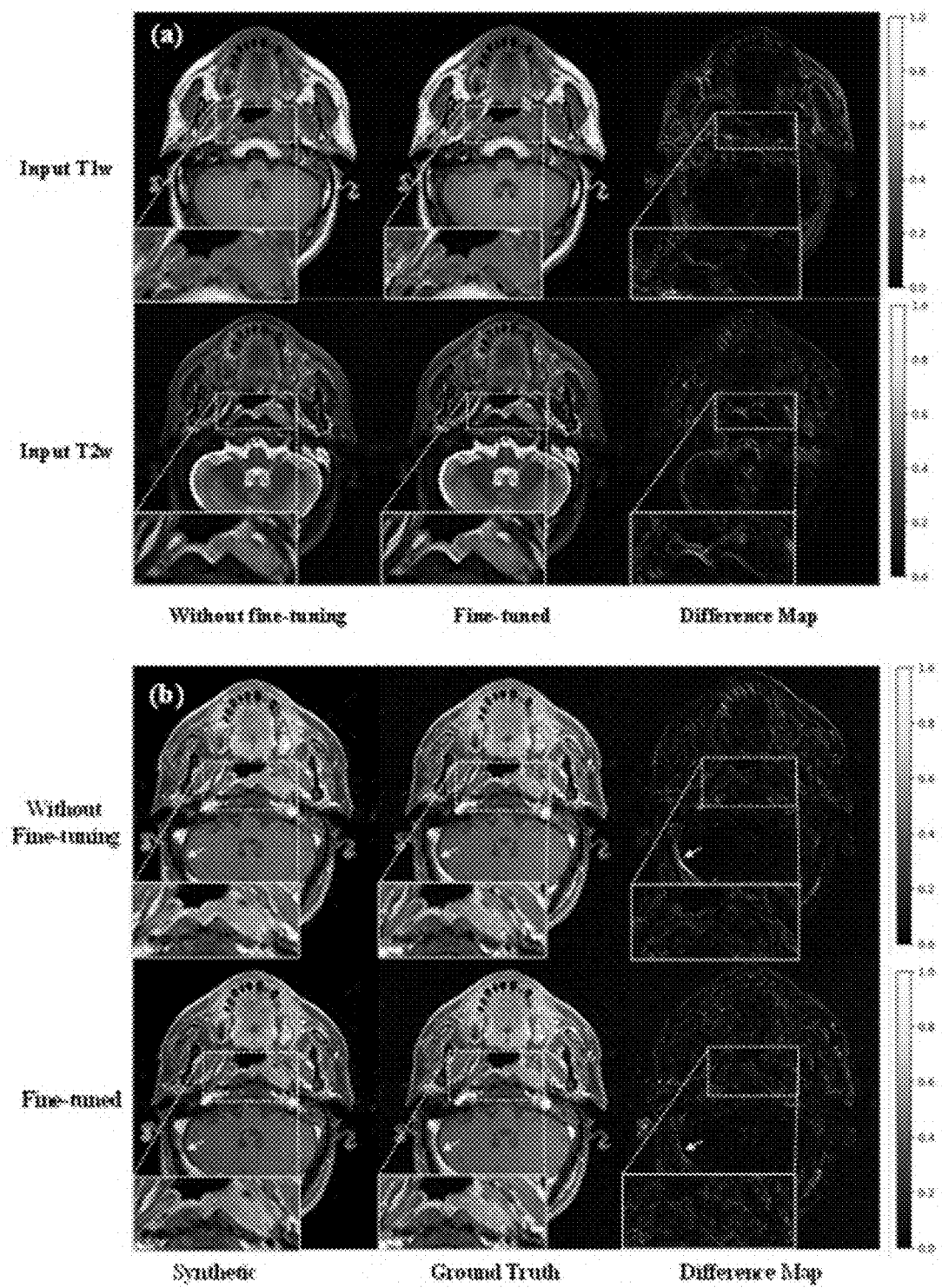
FIG. 10 illustrates an example of the influence of image registration in structural misalignment: (a): structural shift of input T1w (first row) and T2w (second row) between two different image registration methods: registered from hospital system without fine-tuning, and fine-tuned with rigid registration; (b): resultant variations caused by image registration. The first column and the second column in (b) show the difference between synthetic VCE-MRI and ground truth CE-MRI by the two different registration methods; arrows indicate obvious synthetic difference.

Turning to FIG. 9, the degraded accuracy may be, in part, explained by the imperfect alignment among the T1w, T2w and CE-MRI. While it should be noted that conventional image registration methods are still struggling to achieve one-to-one pixel correspondence and was found to be influential in medical image synthesis tasks, the misalignment can lead to structural shift between input and target pairs, thus leading to inaccuracy during model training, since the model will be trained to make wrong prediction. On the contrary, the data acquired from hospital system was directly used as input in the MMgSN-Net without any registration fine-tuning, where a performance decrease of 18.36%, 54.58%, 5.81% and 5.59% for MAE, MSE, SSIM and PSNR, respectively, was observed. The afore-mentioned influence of image registration in structural misalignment is illustrated in FIG. 10.

Table 4 below summarizes quantitative results of the Turing tests from the seven participating oncologists. In Hospital 1, the two oncologists failed to differentiate between the real and virtual contrast-enhanced MR images in approximately half of the cases, with an accuracy of 52% and 42% for Oncologists 1 and 2, respectively. They reported that their decisions were mostly based on the clarity of the alveoli and blood vessels, as well as the texture of the muscles and cerebellum. In Hospital 2, the two oncologists raised the difficulties in discriminating the real and fake images based on the irregularly shaped tumor structures. For this reason, they made their decisions according to the anatomical structures and image signal intensities during the Turing test, resulting in an accuracy of 58% and 52% for Oncologists 3 and 4 from Hospital 2, respectively. In Hospital 3, discussion sessions were held between the Oncologist 5 and 6, in view of the heavy clinical workload. An overall accuracy of 58% was reported based on their judgements. They reported that their decisions were made based on the differences between the parotid gland and non-vascular tissues. In Hospital 4, Oncologist 7 correctly identified only 13, leading to an accuracy of 26%, and was unable to make decisions for another 13 images. Overall, the average accuracy of the seven oncologists was 49.43%, which is in close approximation to a random guess accuracy (i.e., 50%).

TABLE 4

| Hospital | Radiation Oncologist | Evaluation | Results | Percentage |
|---|---|---|---|---|
| Hospital 1 | Oncologist 1 | Correct: | 26 | 52% |
| | | Incorrect: | 21 | 42% |
| | | Give up: | 3 | 6% |
| | Oncologist 2 | Correct: | 21 | 42% |
| | | Incorrect: | 20 | 40% |
| | | Give up: | 9 | 18% |
| Hospital 2 | Oncologist 3 | Correct: | 29 | 58% |
| | | Incorrect: | 21 | 42% |
| | | Give up: | 0 | 0% |
| | Oncologist 4 | Correct: | 26 | 52% |
| | | Incorrect: | 24 | 48% |
| | | Give up: | 0 | 0% |
| Hospital 3 | Oncologists 5 and 6 | Correct: | 29 | 58% |
| | | Incorrect: | 21 | 42% |
| | | Give up: | 0 | 0% |
| Hospital 4 | Oncologist 7 | Correct: | 13 | 26% |
| | | Incorrect: | 24 | 48% |
| | | Give up: | 13 | 26% |
| | | Correct: | | 49.43% |
| | Average: | Incorrect: | | 43.43% |
| | | Give up: | | 7.14% |

(E) Ablation Study:

To identify the importance of the key components in the MMgSN-Net, three ablation studies were conducted. First, to evaluate the importance of the SGS, it was replaced by a concatenation operation. The learned features from individual multimodality learning modules were directly concatenated without performing feature selection. Second, to validate the importance of the multi-level module, the synthesis performance of full MMgSN-Net was compared with that absent the multi-level module. Third, to verify the importance of the self-attention module, it was removed and compared the modified version with the full version of the MMgSN-Net. Evaluating metrics in each comparative pair of the ablation studies were analyzed.

However, for simplicity, only the results of MAE were provided. First, after replacing the SGS with the concatenation operation, the MAE increased from 44.50±13.01 to 45.43±12.97 ($p<0.05$), implying that the SGS contributed to accuracy improvement. Second, after excluding the multi-level module, the MAE increased from 44.50±13.01 to 45.22±13.04 ($p<0.05$), suggesting that the multi-level module enhanced the synthesis performance of MMgSN-Net. Third, after removing the self-attention module, the MAE increased from 44.50±13.01 to 45.89±13.02 ($p<0.05$), indicating that the self-attention module was helpful in capturing long-term dependencies.

However, the results of the Turing test may underscore the reliability of the MMgSN-Net. In a study conducted by Kleesiek et al. (2019), two resident radiologists were invited to distinguish 10 synthetic MR images from another 10 real CE-MRI, chosen in a random manner. The radiologists correctly discriminated between the real and synthetic images in 80% and 90% of cases, respectively. In contrast, in the Turing test of the present disclosure, seven experienced oncologists from multiple hospitals were merely able to correctly classify 49.43% of the presented images, suggesting a higher authenticity of the synthesized VCE-MRI by the MMgSN-Net. It is noteworthy that the high authenticity of the present MMgSN-Net can be observed in both tumor-bearing and tumor-free MR slices. In tumor-bearing slices, the MMgSN-Net model provided comparable tumor visualization with respect to the ground-truth (FIGS. 8C and 8D, insets (c) and (d)). The degree of contrast enhancement is related to the density of capillary bed around the neoplasm, which is considered absent in normal tumor-free regions. In line with this consideration, the MMgSN-Net model also correctly predicted the non-enhanced information in tumor-free MR slices, as shown in FIG. 9C.

Figure 11:
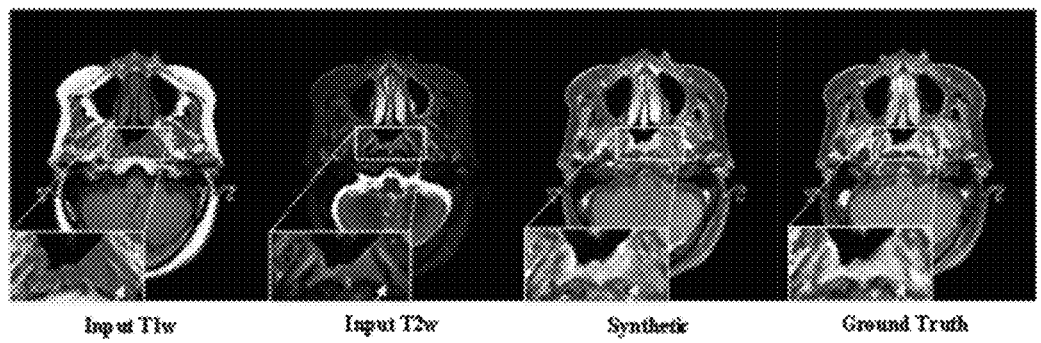
FIG. 11 illustrates an example of a less satisfactory case. The images from left to right show input T1w, input T2w, the synthetic VCE-MRI by MMgSN-Net and ground truth CE-MRI, respectively. Arrows indicate the heterogeneous signal of tumor in different MR modalities.

However, the MMgSN-Net used in these examples was only trained and validated using a small-sized NPC data from the same MRI scanner at a single medical institution, leading to synthesis failure arising from limited training samples for specific patients. An example of this kind of failure is illustrated in FIG. 10. Another factor impacting on synthesis results is intratumoral heterogeneity which exists in cellular level and is highly dependent on its genetic background and surrounding micro-environment. Intratumoral heterogeneity causes heterogeneous tumor signal intensities of the MRI, as shown in the example of FIG. 11, where the intratumoral heterogeneity from T1w-, T2w-, and ground truth CE-MRI and the corresponding heterogeneity in the synthetic VCE-MRI resulted therefrom are indicated by arrows.

The MMgSN-Net only trained with T1w- and T2w-MRI data may also limit the performance of synthesis network since T1w- and T2w-MRI may not provide complete information for VCE-MRI synthesis. One solution may be to include more MR modalities, e.g., diffusion-weighted MRI, as input to the network. A more homogeneous dataset for model training or a larger dataset from different MRI scanners and/or from different medical institutions likely minimizes "data bias", in turn increasing generalizability of the trained model.

Although the invention has been described in terms of certain embodiments, other embodiments apparent to those of ordinary skill in the art are also within the scope of this invention. Accordingly, the scope of the invention is intended to be defined only by the claims which follow.

INDUSTRIAL APPLICABILITY

The VCE-MRI generated by the present invention does not only apply to precision tumor delineation in radiotherapy for cancer patients, but also to tumor staging based on the generated VCE-MRI.

What is claimed is:

1. A system for precision tumor delineation in cancer treatment and diagnosis for subjects in need thereof based on synthesis of contrast agent-free, virtual MRI data, the system comprises:
   a data acquisition module acquiring MRI data from at least two medical institutions, the acquired MRI data comprising contrast agent-free T1-weighted (T1w), T2-weighted (T2w) MRI data, and contrast agent-enhanced MRI (CE-MRI) data;
   a data pre-processing module pre-processing the acquired MRI data comprising resampling thereof by standardizing image size of different MRI data acquired from different medical institutions and subjecting the resampled MRI data to normalization or standardization, said normalization or standardization comprising normalization or standardization based on a whole image dataset, a single image data, or image data obtained from a single subject;
   a model training module utilizing the T1w-MRI and T2w-MRI data from a training dataset containing some of the T1w-MRI, T2w-MRI and CE-MRI data after said pre-processing as an input of the neural network while utilizing the CE-MRI data from the training dataset as a learning target of the neural network only for model training and internal evaluation; and
   a virtual image generation module utilizing contrast agent-free MRI data from at least one external medical institution for external evaluation prior to generating a virtual contrast-enhanced MRI (VCE-MRI) data, said at least one external medical institution being different from the at least two medical institutions.

2. The system of claim 1, wherein the acquired MRI data from the at least two medical institutions comprise MRI data acquired under different scanning conditions, wherein said scanning conditions comprise one or more of magnetic field intensity, configuration of RF coil(s), spatial resolution of images, phase encoding levels, use of fast scanning sequence, scanning time, repetition time (TR), echo time (TE), and number of excitations (NSA).

3. The system of claim 1, wherein the acquired MRI data from the at least two medical institutions comprise MRI data obtained from MRI scanners of different manufacturers.

4. The system of claim 1, wherein the acquired MRI data comprise 1.5T MRI and 3T MRI data.

5. The system of claim 1, wherein the T1w-MRI, T2w-MRI and CE-MRI data of different subjects are acquired on the same day in sequence.

6. The system of claim 1, wherein the VCE-MRI data are generated by using MRI imaging and scanning parameters of the external medical institutions to scan the subjects.

7. The system of claim 1, wherein the MRI data from different subjects are randomly selected for modifying the MRI imaging and scanning parameters in order to enhance diversity of the training dataset.

8. The system of claim 1, wherein the normalization or standardization is performed by z-score normalization.

9. The system of claim 8, wherein the z-score normalization is based on the image data obtained from a single subject.

10. The system of claim 1, wherein the neural network is built based on an architecture of a multimodality-guided synergistic neural network (MMgSN-Net).

11. The system of claim 10, wherein the MMgSN-Net is configured to become a two-input neural network comprising sub-components of multimodality learning modules, synthesis network, self-attention module, multi-level module and discriminator.

12. The system of claim 11, wherein the T1w-MRI and T2w-MRI data are separately inputted into two different multimodality learning modules.

13. The system of claim 12, wherein the two different multimodality learning modules extract features from the T1w-MRI and T2w-MRI data, respectively.

14. The system of claim 13, wherein the extracted features from the T1w-MRI and T2w-MRI data by the respective multimodality learning modules are fed to the synthesis network for complementary feature selection and fusion.

15. The system of claim 14, wherein the selected and fused features after the synthesis network are further subjected to the self-attention module and multi-level module for focusing on an enhanced exploded structure and increasing the neural network's insight, thereby emphasizing regions of relatively larger tumors and tissues adjacent thereto.

16. The system of claim 15, wherein the features after being subjected to the self-attention module and multi-level module are used to generate the VCE-MRI data.

17. The system of claim 16, wherein the as-generated VCE-MRI data and contrast-enhanced MRI (CE-MRI) data obtained from contrast agent-injected subjects are fed into the discriminator to train the discriminator how to differentiate images of VCE-MRI from CE-MRI, and feedback the training result to the synthesis network, thereby increasing synthesis accuracy of VCE-MRI and the decision making accuracy by the discriminator.

18. The system of claim 1, further comprising a data matching module for distribution matching of a mean value of an external dataset formed from image data of the at least one external medical institution with a mean value of the target training dataset formed from the closest training dataset to the external dataset in order to minimize intensity variation of the external dataset.

19. The system of claim 18, wherein the distribution matching is performed according to the following equation:

$$y=(\mu 1/\mu 2)*x,$$

wherein x represents pixel value of MRI data of the external dataset; μ1 represents mean pixel value of the training dataset; μ2 represents mean pixel value of the external dataset; y represents the matched pixel value.

20. The system of claim 19, wherein the external dataset after the distribution matching has the same mean pixel value as that of the training dataset which minimizes data distribution variation of the external dataset, thereby improving generalizability of the model after training and also reserving original scale of the image data.

21. The system of claim 1, further comprising a classification network to screen out unfit data from the neural network in order to increase the reliability thereof.

22. A method for improving generalizability of a neural network for precision tumor delineation in cancer treatment or diagnosis for subjects in need thereof based on contrast agent-free, virtual contrast-enhanced MRI data generated by the system of claim 18, the method comprising forming a training dataset containing some of MRI data obtained from different subjects and/or acquired under different imaging and scanning conditions from multiple medical institutions to increase diversity of the training dataset followed by pre-processing to normalize or standardize image size of multiple MRI data prior to inputting the pre-processed MRI data into a multimodality-guided synergistic neural network (MMgSN-Net) for training to obtain a multi-hospital data-guided neural network (MHDgN-Net), matching an external dataset obtained from at least one external medical institution with the training dataset to obtain a matched pixel value such that both the external dataset and the training dataset have the same mean pixel value to minimize intensity variation of the external dataset, and inputting the external dataset after said matching into the MHDgN-Net for external evaluation, prior to generating virtual contrast-enhanced MRI (VCE-MRI).

23. The method of claim 22, wherein only T1w-MRI and T2w-MRI data from the training dataset are matched with the corresponding T1w-MRI and T2w-MRI data from the external dataset in order to avoid using contrast-enhanced MRI (CE-MRI) data obtained from GBCAs.

24. The method of claim 22, wherein the generalizability of the neural network is validated by the external dataset after said matching.

25. The method of claim 23, wherein the matching of the external dataset with the training dataset is performed by the following equation:

$$y=(\mu 1/\mu 2)*x,$$

wherein x represents pixel value of MRI data of the external dataset; μ1 represents mean pixel value of the training dataset; μ2 represents mean pixel value of the external dataset; y represents the matched pixel value.

* * * * *